United States Patent
Goodman et al.

(10) Patent No.: US 6,625,703 B2
(45) Date of Patent: Sep. 23, 2003

(54) VERIFYING PRIMARY AND BACKUP COPIES OF VITAL INFORMATION FOR A PROCESSING SYSTEM EMPLOYING A PSEUDO-FIXED REFERENCE IDENTIFIER

(75) Inventors: Brian Gerald Goodman, Tucson, AZ (US); Ronald Faye Hill, Jr., Tucson, AZ (US); Leonard George Jesionowski, Tucson, AZ (US); Timothy Keith Pierce, Tucson, AZ (US); Robin Daniel Roberts, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 09/847,415

(22) Filed: May 3, 2001

(65) Prior Publication Data

US 2002/0053008 A1 May 2, 2002

Related U.S. Application Data

(63) Continuation-in-part of application No. 09/703,906, filed on Nov. 2, 2000.

(51) Int. Cl.$^7$ ............................................. G06F 12/00
(52) U.S. Cl. ..................... 711/162; 700/213; 700/214; 700/215; 369/34; 369/36; 369/38
(58) Field of Search ......................... 711/162; 700/213, 700/214, 218; 369/34, 36, 38

(56) References Cited

U.S. PATENT DOCUMENTS

| | | | |
|---|---|---|---|
| 5,303,214 A | * | 4/1994 | Kulakowski et al. ......... 369/43 |
| 5,544,304 A | | 8/1996 | Carlson et al. ......... 395/182.08 |
| 5,615,400 A | | 3/1997 | Cowsar et al. ............... 395/685 |
| 5,713,024 A | | 1/1998 | Halladay ..................... 395/712 |
| 5,809,511 A | * | 9/1998 | Peake .......................... 707/204 |
| 5,819,309 A | * | 10/1998 | Gray ........................... 711/111 |
| 5,940,854 A | | 8/1999 | Green, Jr. et al. .......... 711/112 |
| 6,012,068 A | | 1/2000 | Boezeman et al. ......... 707/104 |
| 6,216,057 B1 | * | 4/2001 | Jesionowski ................ 700/214 |

OTHER PUBLICATIONS

"Production Environment Product Conversion Facility", IBM Technical Disclosure Bulletin, vol. 37, No. 12, Dec. 1994, pp. 215–218.

* cited by examiner

*Primary Examiner*—Do Hyun Yoo
*Assistant Examiner*—Ngoc V Dinh
(74) *Attorney, Agent, or Firm*—John H. Holcombe

(57) ABSTRACT

Verification of a primary or backup copy of vital information of a processing system employs a pseudo-fixed reference identifier, defined as an identifier unlikely to change over the life of the system, and controls which copy of vital information is correct. The primary copy of vital information is associated with a copy of the pseudo-fixed reference identifier and a backup copy of the vital information is associated with a copy of the pseudo-fixed reference identifier. A processor, when triggered, reads the pseudo-fixed reference identifier, compares it to the stored copies of the identifier of the primary and backup non-volatile storage. (1) If the read pseudo-fixed reference identifier matches the primary copy of the identifier, the processor indicates the vital information is valid. (2) If the read pseudo-fixed reference identifier matches the backup only, indicating that the backup copy of vital information is to be restore copied to become the primary copy.

85 Claims, 9 Drawing Sheets

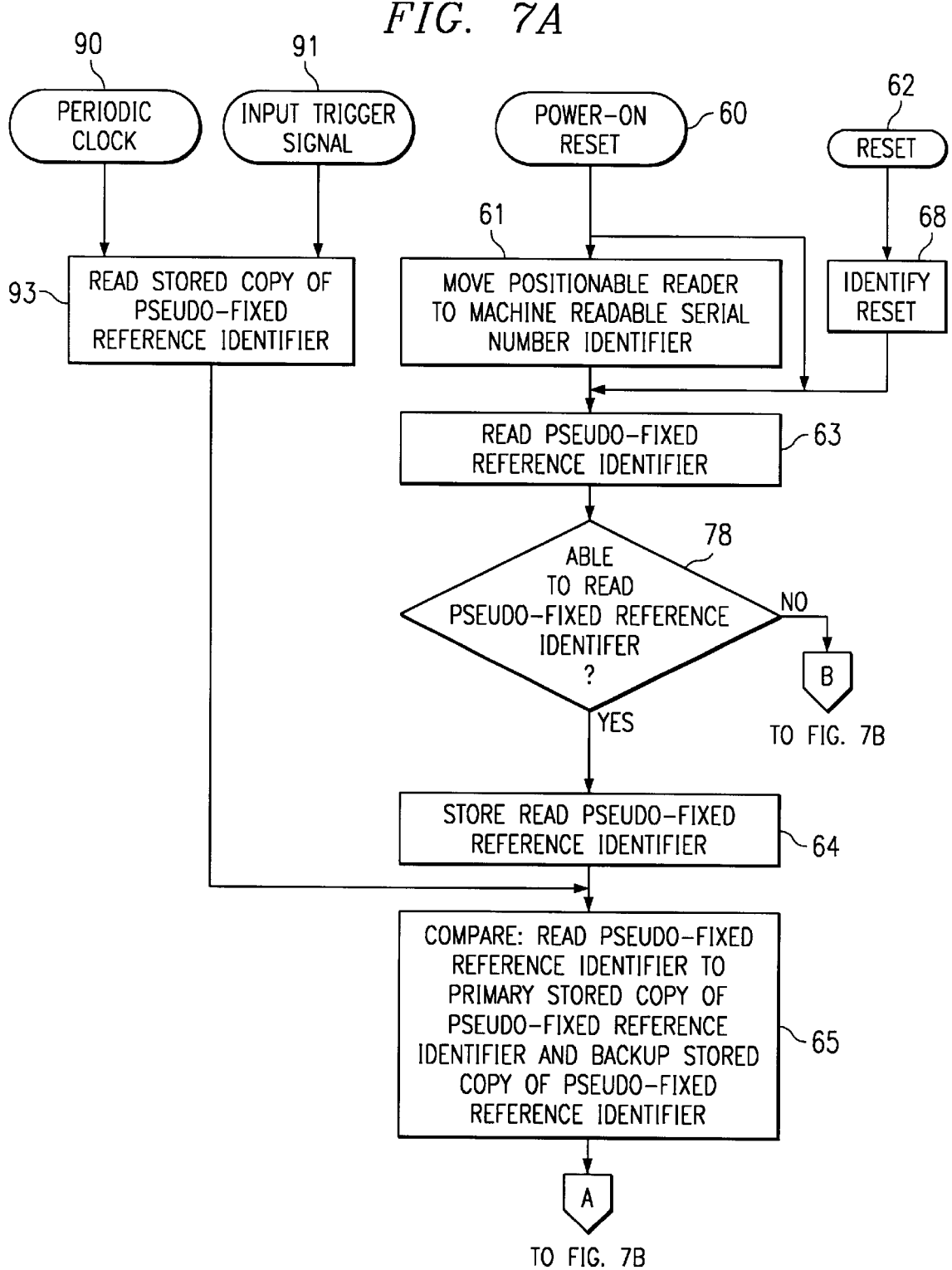

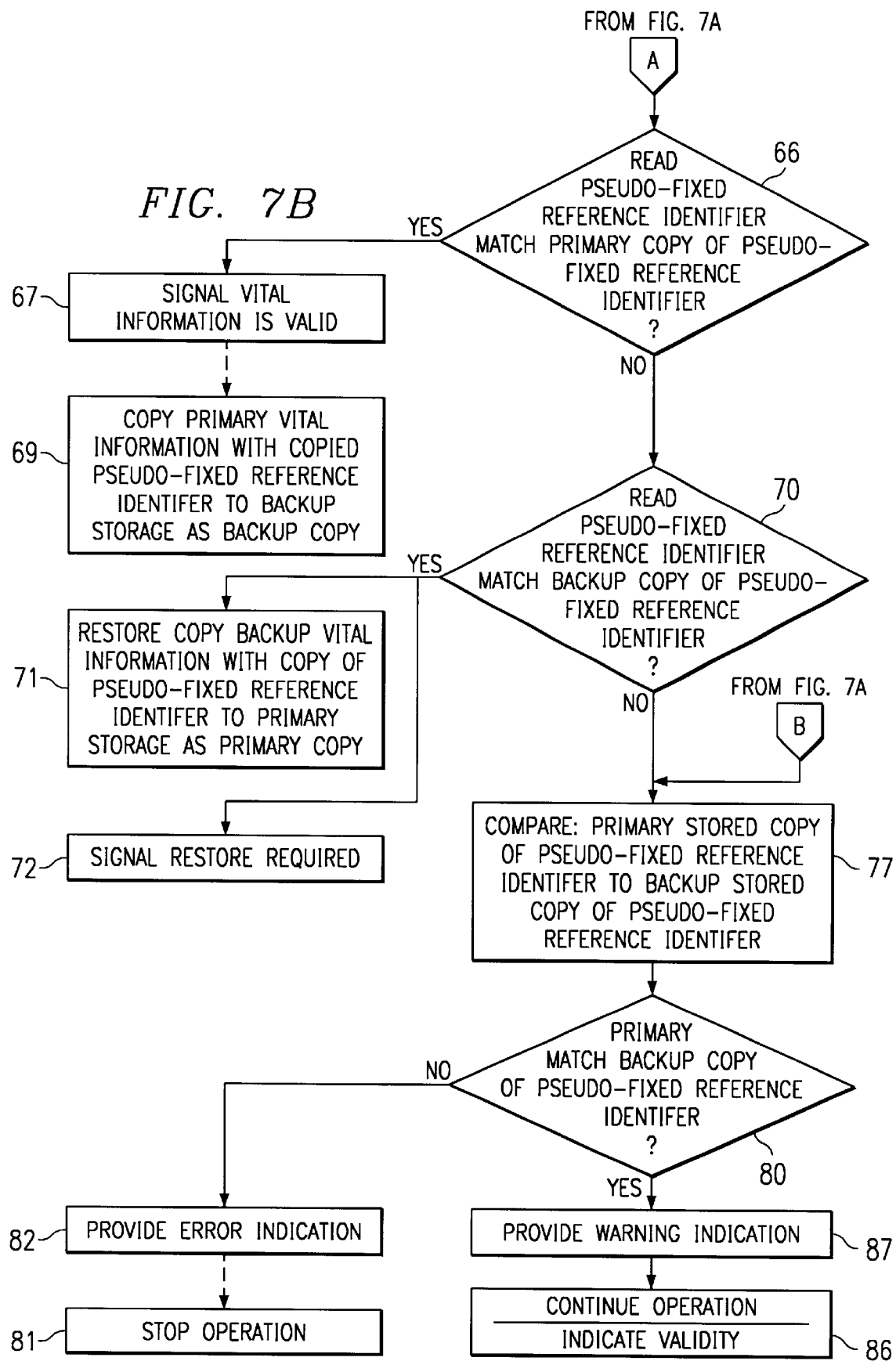

VERIFYING PRIMARY AND BACKUP COPIES OF VITAL INFORMATION FOR A PROCESSING SYSTEM EMPLOYING A PSEUDO-FIXED REFERENCE IDENTIFIER

CROSS-REFERENCE TO RELATED APPLICATION

This application is a continuation-in-part of U.S. application Ser. No. 09/703,906, entitled "VERIFYING PRIMARY AND BACKUP COPIES OF VITAL INFORMATION FOR A LIBRARY EMPLOYING A MACHINE READABLE SERIAL NUMBER IDENTIFIER", which was filed in the U.S. Patent & Trademark Office on Nov. 2, 2000.

FIELD OF THE INVENTION

This invention relates to processor systems, such as embedded systems, an example of which is an automated data storage library having at least one accessor for accessing data storage media in a plurality of storage shelves, and, more particularly, to processor systems which employ primary and backup non-volatile storage for storing primary and backup copies of vital information for operating the processor system.

BACKGROUND OF THE INVENTION

Processor systems, such as embedded systems, require vital information that describes the physical configuration, the logical configuration, and the engineering changes of the system in which the processor(s) is embedded.

One example of an embedded system is an automated data storage library. Data processing systems typically require large amounts of data storage capacity, some of which is needed quickly and may be stored in memory and hard disk drives, and other of which is not immediately required. As an example, data not immediately required may comprise data that is infrequently accessed, and the storage of the data may be in removable data storage media, such as magnetic tape cartridges or optical disk cartridges, stored in automated data storage libraries for the use of host data processing systems. Such automated data storage libraries provide efficient access to large quantities of the data storage media, which are stored in storage shelves and which are accessed by one or more accessors and delivered to data storage drives in the library. In one example, a magnetic tape cartridge automated data storage library stores over 6,000 cartridges.

The data stored in automated data storage libraries is not frequently accessed, but when needed, is needed promptly. Also, data to be stored in a library builds up quickly and must be stored without undue delay. Thus, if the library, or the library controller computer processor, is subject to a power-on reset, it must come up to full capability as soon as possible so that the library is available to provide data access and storage.

Typically, every library is at a different level with regard to engineering change levels, physical configuration, and logical configuration, and has different calibration values, e.g., for aligning the accessor. This information is called vital information, or vital product data (VPD). In order to quickly bring a library controller online, vital information is stored in non-volatile storage and is accessible by the computer processor. The stored vital information may be accessed much more rapidly than a manual process can be employed to re-construct the vital information for a given library. Further, if the cause of the power-on reset was unexpected, and the vital information were unavailable for a manual entry, the down time could be drawn out.

Other examples of embedded systems which require vital information include an aircraft "fly-by-wire" calibration system, a power generation system, a power distribution system, a distributed processor automotive system, and medical equipment.

It is very desirable to have an additional backup copy of the vital information in a separate backup non-volatile storage, for example, in case the component or FRU (field replaceable unit) containing the primary copy of the vital information is removed and replaced with a replacement FRU. In this case, the vital information could be restore copied to the replacement primary non-volatile storage from the backup non-volatile storage without requiring manual reconstruction. This backup copy might exist within the library on another FRU, or external to the library, e.g., on the local server managed by library management software.

When a backup copy is implemented, the trigger for the backup event must ensure that an invalid primary copy is never used to do a backup and that an invalid backup copy is never used to do a restore. As one example, where a real-time clock is available, the primary and backup copies may each be time stamped, and the time stamps compared before backup or restore is initiated. An example of time-stamping information to indicate the currency of the information is described in coassigned U.S. Pat. No. 6,065,018, Beier et al. However, FRU swapping in the field could potentially undermine the check in that an invalid primary copy of vital information from another machine might look more recent than the valid backup copy.

As another example, multiple backup copies may be employed, and a vote taken and the majority vote assumed to be correct. However, the comparison takes time and provides no true assurance of correctness.

SUMMARY OF THE INVENTION

An object of the present invention is to provide verification of a primary or backup copy of vital information.

In a one embodiment, for example, in a multi-node system, a pseudo-fixed reference identifier is provided at a reference location in the processing system.

A pseudo-fixed reference identifier is defined as an identifier that is unlikely to be changed over the lifetime of the machine or system in which it is implemented, such as a machine serial number. The pseudo-fixed reference identifier is employed to control which copy of vital information is correct, as opposed to time stamps or voting schemes. Primary non-volatile storage is provided at a node of the processing system separate from and coupled to the reference location, for storing a primary copy of vital information, and for storing a copy of the pseudo-fixed reference identifier associated with the primary copy of the vital information. Backup non-volatile storage is provided at a node of the processing system coupled to the primary non-volatile storage, for storing a backup copy of the vital information, the backup copy copied from the primary copy of vital information and associated with a copy of the pseudo-fixed reference identifier. At least one processor is coupled to the reference location, the primary non-volatile storage and the backup non-volatile storage. In accordance with an embodiment of a processor implemented method, the processor:

upon a reset identified by the processor, reads the pseudo-fixed reference identifier from the reference location;

compares the read pseudo-fixed reference identifier to the stored copies of the pseudo-fixed reference identifier of the primary non-volatile storage and the backup non-volatile storage; and if the read pseudo-fixed reference identifier matches the primary stored copy of the pseudo-fixed reference identifier, the processor indicates the vital information is valid; if the read pseudo-fixed reference identifier matches the backup stored copy of a pseudo-fixed reference identifier only, the backup copy of vital information is correct and is to be restore copied as the primary copy.

As defined above, a pseudo-fixed reference comprises a reference that is unlikely to be altered over time, as compared to the time in which components or FRUs (field replaceable units) are subject to replacement. One example is a sensible indicator, such as a fixed bar code label which is read by a reader. Another example is an electronically readable "electronic serial number" fixed in an electronic module. A further example is an arrangement of I/O pins. Other examples comprise settable switches of an electronic module, such as manually settable "DIP" switches or manually settable multi-position switches. A still further example comprises a value stored in a non-volatile memory device, such as a PROM, battery backup RAM, FPGA, ASIC, etc.

In an embodiment of an automated data storage library having a plurality of storage shelves for storing data storage media, at least one accessor for accessing the data storage media in the plurality of storage shelves, a machine readable serial number identifier is provided, comprising the pseudo-fixed reference identifier. A positionable reader reads the machine readable serial number identifier under the control of a library controller. Primary and backup non-volatile storage are provided for storing primary and backup copies of the vital information. The library controller comprises at least one computer processor which is coupled to the accessor, the positionable reader, and to the primary and backup non-volatile storage. Additionally, the library controller stores programs for operating the library in accordance with the vital information.

An embodiment of a computer implemented method of verifying the primary and backup copies of vital information for the library comprises storing a copy of the pseudo-fixed reference identifier, comprising the serial number identifier, associated with the primary copy of the vital information of the primary non-volatile storage; and copying the primary copy of vital information to the backup non-volatile storage as the backup copy and associated with the serial number identifier.

In accordance with the computer implemented method, upon a power-on reset of the computer processor, the positionable reader is operated to read the machine readable serial number identifier; the read serial number identifier is compared to the stored serial number identifiers of the primary storage and the backup storage, and:

if the read serial number identifier (which is the pseudo-fixed reference identifier) matches the primary stored serial number identifier (which is the copy of the pseudo-fixed reference identifier), the primary copy of vital information is correct; and if the read serial number identifier matches the backup stored copy of the serial number identifier only, the processor restore copies the backup copy of vital information to the primary non-volatile storage as the primary copy.

Additionally, in the processing system, if the read pseudo-fixed reference identifier fails to match either the primary stored copy of the pseudo-fixed reference identifier or the backup stored copy of the pseudo-fixed reference identifier, or if the pseudo-fixed reference identifier can't be read, the primary and backup copies of the pseudo-fixed reference identifier are compared. If they match, the processor indicates that the vital information is valid. If they don't match, the processor provides an error indication.

For a fuller understanding of the present invention, reference should be made to the following detailed description taken in conjunction with the accompanying drawings.

BRIEF DESCRIPTION OF THE DRAWINGS

FIGS. 6 and 7 are flow charts depicting embodiments of the computer implemented method in accordance with the present invention for conducting verification and backup and restore of vital information employing a pseudo-fixed reference identifier;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
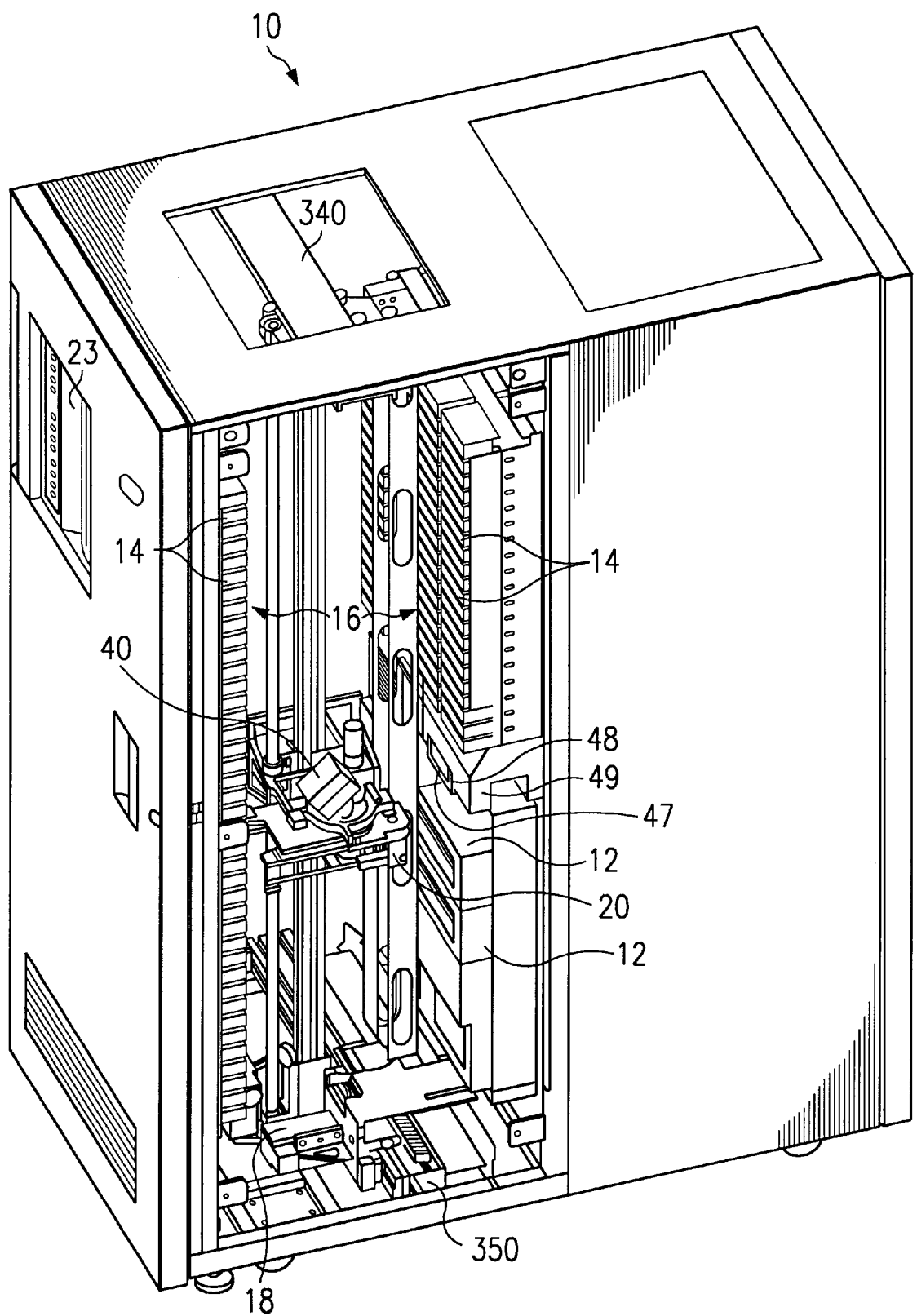
FIGS. 1 and 2 are perspective views of an embodiment of an automated data storage library in which primary and backup copies of vital information for the library are verified employing a pseudo-fixed reference identifier.
Figure 2:
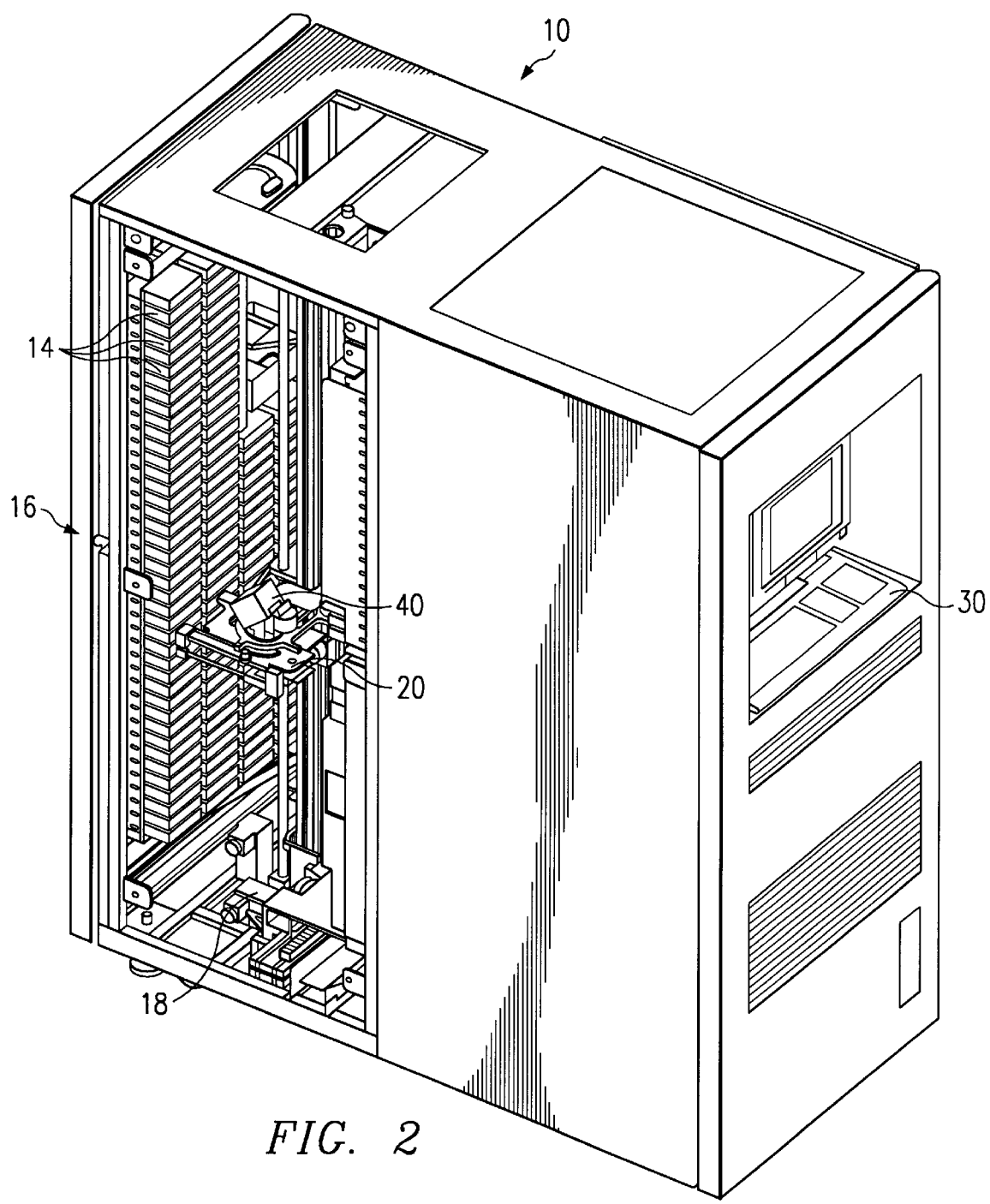
Figure 3:
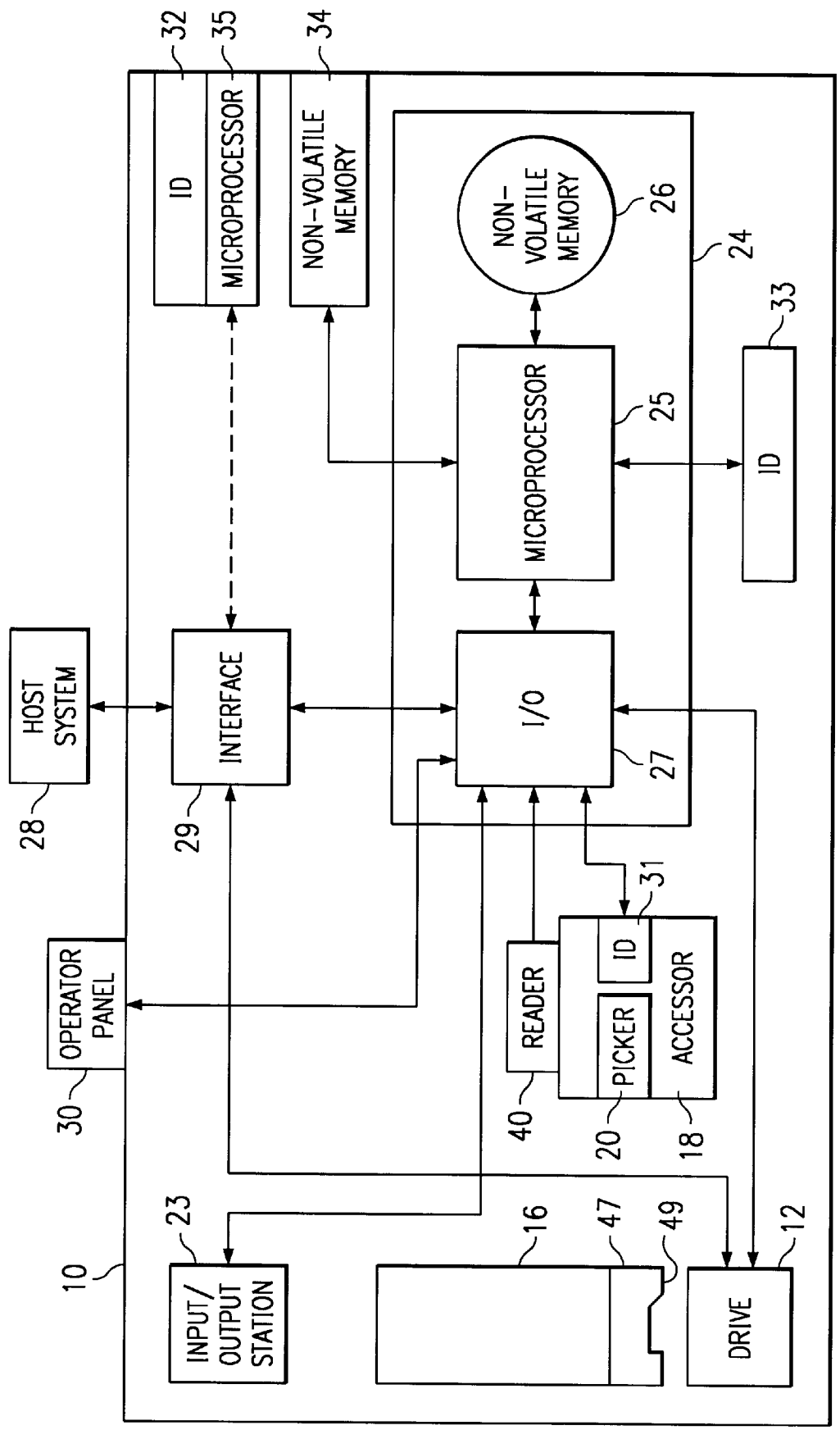
FIG. 3 is a block diagram of the automated data storage library of FIGS. 1 and 2.
Figure 4:
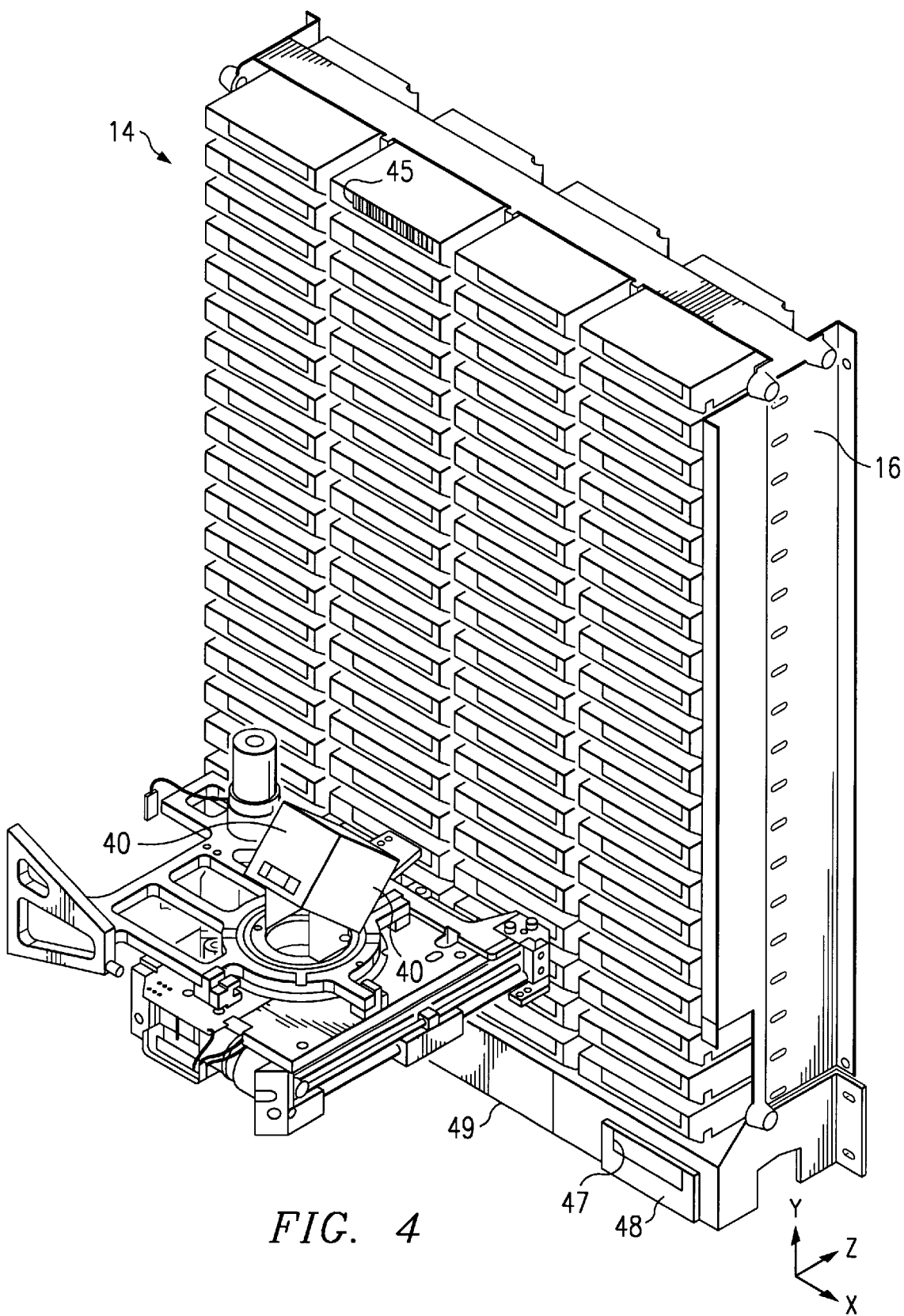
FIG. 4 is an illustration of a pseudo-fixed reference identifier comprising a positionable reader in proximity to a machine readable serial number identifier and a bank of storage shelves of the library of FIGS. 1 and 2.

Referring to FIGS. 1, 2 and 3, an embodiment of a system advantageously employing the present invention is illustrated, comprising an automated data storage library in which components or FRUs (field replaceable units) are subject to replacement. As discussed above, it is desirable to have a backup copy of the vital information in a separate backup non-volatile storage in case the component or FRU containing the primary copy of the vital information is removed and replaced with a replacement FRU. In this case, the vital information could be restore copied to the replacement primary non-volatile storage from the backup non-volatile storage without requiring manual intervention. This backup copy might exist within the library on another FRU, or external to the library, e.g., on the local server or a host server managed by library management software.

The specific automated data storage library 10 illustrated in FIGS. 1–3 comprises one or more data storage drives 12, for example, for reading and/or writing data on removable data storage media 14, such as magnetic tape cartridges or optical disk cartridges. A plurality of the data storage media 14 are stored in banks of storage shelves 16. An accessor 18 mounts a picker 20, and moves horizontally on rails 340 and 350 and vertically to move the picker to access data storage media 14 and transport the media amongst the data storage drives 12, the storage shelves 16, and an input/output station 23. An example of an automated data storage library which may implement the present invention is the IBM 3494 Automated Tape Library, which stores magnetic tape cartridges.

A library controller 24 is provided which may comprise at least one microprocessor 25, a non-volatile memory device 26, such as a disk drive and/or flash memory, and input/output circuits or adapters 27, such as serial ports or register I/O. The controller is coupled with, and controls the operation of, the accessor 18 and picker 20, and may interface with the data storage drives 12. The controller may be coupled to one or more of the input/output stations 23, which allow the transfer of data storage media 14 into and out of the library. The library controller 24 may be further coupled to an operator panel 30, and is also coupled to a host system 28, typically via an interface 29, such as SCSI ports. The controller 24 receives access commands from the host system 28 for the selection and transport of data storage media 14 amongst the data storage drives 12, the storage shelves 16, and the input/output station 23. The host system 28 may be coupled to the drives 12, and information to be recorded on, or to be read from, selected data storage media 14 may be transmitted between the drives and the host system 28. Alternatively, the library controller may be coupled to the data storage drives 12, and transfers the data between the drives and the host system.

The library controller 24 stores programs for operating the library in accordance with the vital information. The library controller may comprise one or a plurality of programmable microprocessors 25 which are operated by one or more operating systems and one or more application programs for operating the library, in accordance with the present invention. One example of a suitable processor comprises an IBM Power PC processor. The application programs may comprise program products, having processor readable program code. A program product may be supplied electronically, as from a network of the host system 28, at communications interface 29. Alternatively, the program product may be supplied at an input terminal of the processor, such as operator panel 30, from a storage media which stores executable instructions, and comprises an article of manufacture. An example of a storage media which is an article of manufacture is a magnetic diskette. Other suitable storage media are optical disks, removable hard disk cartridges, read only memories (ROM) or programmable read only memories (PROM). The requirement for the storage media or memories is that they store digital representations of executable instructions. The operating systems and application programs are stored in memory, for example, in the non-volatile memory device 26.

The library controller 24 may comprise one or more FRUs which are typically subject to update or upgrades, or may require repair actions, requiring the addition or replacement of the FRU or removable components. Additionally, the controller may be subject to power off situations while other components or FRUs of the library are replaced, upgraded or subject to service actions. Further, every library may be at a different level with regard to engineering change levels, physical configuration, and logical configuration, and may have different calibration values, e.g., for aligning the accessor. As discussed above, this information is called vital information. In order to quickly bring a library controller online, the vital information is stored in the non-volatile storage 26 and is accessible by the processor 25. The stored vital information may be accessed much more rapidly than a manual process can be employed to re-construct the vital information for a given library. Further, if the cause of the power-on reset was unexpected, and the vital information were unavailable for a manual process, the down time could be drawn out.

A backup copy of the vital information is provided in a separate backup non-volatile storage 34. Thus, the vital information may be restore copied to the replacement primary non-volatile storage from the backup non-volatile storage without requiring manual intervention. This backup copy might exist with another FRU in the library coupled to the microprocessor 25, or with another microprocessor 35 in the library on another FRU, or external to the library, e.g., on the local server or a host server managed by library management software.

When a backup copy is made, the backup event must ensure that an invalid primary copy is never used to do a backup, and an invalid backup copy must never be used to do a restore.

Hence, in accordance with the present invention, a pseudo-fixed reference identifier is provided at a fixed reference location of the processing system. A pseudo-fixed reference identifier is defined as an identifier that is unlikely to be changed over the lifetime of the machine or system in which it is implemented, such as a machine serial number. The pseudo-fixed reference identifier is employed to control which copy of vital information is correct, as opposed to time stamps or voting schemes. Referring to FIGS. 1–5, one example of a pseudo-fixed reference identifier comprises a machine readable serial number identifier 47, mounted on the frame of the library, for example, by means of a mounting plate 48 on a bracket 49 fixed to the frame such that the machine readable serial number identifier 47 is at a predetermined location of the frame. Herein, "serial number" shall be defined as any unique identifier for the particular library, and the machine readable identifier comprises any sensible indicator. Another example of a pseudo-fixed reference indicator comprises an electronically readable "electronic serial number" fixed in an electronic module. A further example is an arrangement of I/O pins. Other examples comprise settable switches of an electronic module, such as manually settable "DIP" switches or manually settable multi-position switches. A still further example comprises a value, such as a random number, millisecond counter output, or a microsecond counter output, set at set up, configuration or manufacturing time, which may be stored in a non-volatile memory device, such as a PROM, battery back-up RAM, FPGA, ASIC, etc. As discussed above, the value is not subject to change during normal operation.

Figure 5A:
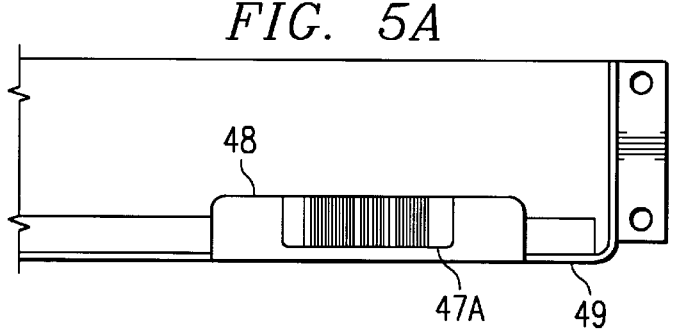
FIGS. 5A and 5B are illustrations of alternative embodiments of the machine readable serial number identifier of FIG. 4.
Figure 5B:
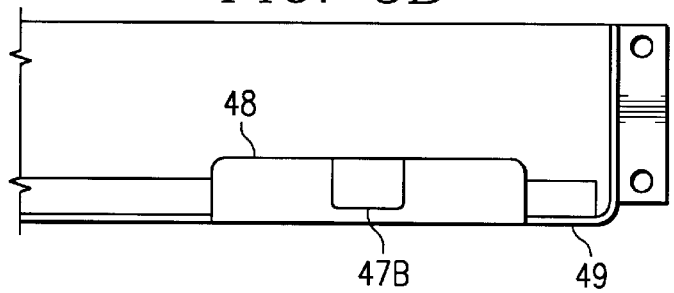

Referring additionally to FIG. 5A, one example of the machine readable serial number identifier 47A may comprise a bar code label or other sensible indicator. Referring additionally to FIG. 5B, another example of the machine readable serial number identifier 47B may comprise a contactless transceiver, such as an RF "Smart Card" transceiver or other contactless memory. A positionable reader 40, such as a bar code reader, is provided for reading the machine readable serial number identifier. In the operation of the library, the positionable reader may also be employed for reading the bar code labels 45 which identify each of the data storage media 14. The reader may be mounted on the accessor 18, either directly, or on the picker 20, to be moved to the machine readable serial number identifier 47 for reading the serial number identifier.

The computer processor 25 of the library controller 24 is associated with the primary non-volatile storage 26 for storing the primary copy of the vital information, for example, when the vital information is first stored or updated. The serial number identifier is read and stored associated with the primary copy of the vital information of the primary non-volatile storage. Then, the primary copy of vital information is copied to the backup non-volatile storage 34 as the backup copy, and the serial number identifier copied and stored such that the serial number is associated with the backup copy of vital information. In this context, "associated" is defined herein as not necessarily stored directly with or adjacent the vital information, but accessible at substantially the same time, for example, as stored at differing addresses within the same or another non-volatile storage.

In accordance with the present invention, upon a power-on reset of the computer processor 25, or a reset sensed by the computer processor, the positionable reader 40 is operated to read the machine readable serial number identifier 47. The library controller compares the read serial number identifier to the stored serial number identifiers of the primary storage 26 and the backup storage 34. If the read serial number identifier matches the primary stored serial number identifier, the primary copy of vital information is indicated as correct. If the read serial number identifier matches the backup stored serial number identifier only, the backup copy of vital information with the serial number identifier is to be restore copied to the primary non-volatile storage 26 as the primary copy. The restore copy may be conducted automatically by the computer processor, or a message sent to, e.g., the operator panel 30 so an operator may determine the timing of the restore copy function, e.g., after other changes are made.

Thus, in each of the situations, the primary and the backup copies of the vital information are validated.

If the primary copy of vital information has been validated, as above, it may be copied to the backup non-volatile storage 34, with the serial number identifier, as a new backup copy. Thus, if the primary copy has been updated, the backup copy is now also updated, as will be discussed.

If the read serial number fails to match either the primary stored serial number identifier or the backup stored serial number identifier, there is no guarantee that both the primary and backup copies of the vital information are valid. Thus, in one embodiment of the invention, if the primary stored serial number identifier fails to match the backup stored serial number identifier, the library controller 24 provides an error indication. But if the primary stored serial number matches the backup stored serial number identifier, operation of the library is continued, and a warning indication is provided, indicating a likely problem with the machine readable serial number identifier 47.

As alternative embodiments, the pseudo-fixed reference identifier may be located at a reference location of the processing system, separate from and coupled to the primary non-volatile memory 26, and separate from and coupled to the processor 25, for example, at accessor 18, comprising pseudo-fixed reference 31. As another example, the pseudo-fixed reference may be coupled to another processor 35, comprising the pseudo-fixed reference 32. A still further example comprises pseudo-fixed reference 33 located at the library controller 24, but which pseudo-fixed reference is a separate replaceable part coupled to the primary non-volatile memory and the processor 25, for example, by being located at the mount for the "motherboard" of the library controller.

The functioning of the library is the same as described above except that the library controller 24 does not operate the accessor 18 to move the reader 40 to read the machine readable serial number, but instead directly reads the pseudo-fixed reference identifier. The pseudo-fixed reference identifier, the primary copy, and the backup copy must all reside on separate replaceable parts, where the pseudo-fixed reference identifier is unlikely to be replaced.

As discussed above, a pseudo-fixed reference comprises an reference that is unlikely to be altered over time, as compared to the time in which components or FRUs are subject to replacement. One example is a sensible indicator, such as the fixed bar code label which is read by a reader. Another example is an electronically readable "electronic serial number" fixed in an electronic module. A further example is an arrangement of I/O pins. Other examples comprise settable switches of an electronic module, such as manually settable "DIP" switches or manually settable multi-position switches. A still further example comprises a value stored in a non-volatile memory, such as a PROM, battery back-up RAM, FPGA, ASIC, etc. The value may originally be obtained from a random number generator, a millisecond counter output, or a microsecond counter output, and set at set up, configuration or manufacturing time, but, once set, cannot be subject to change during normal operation.

Figure 6:
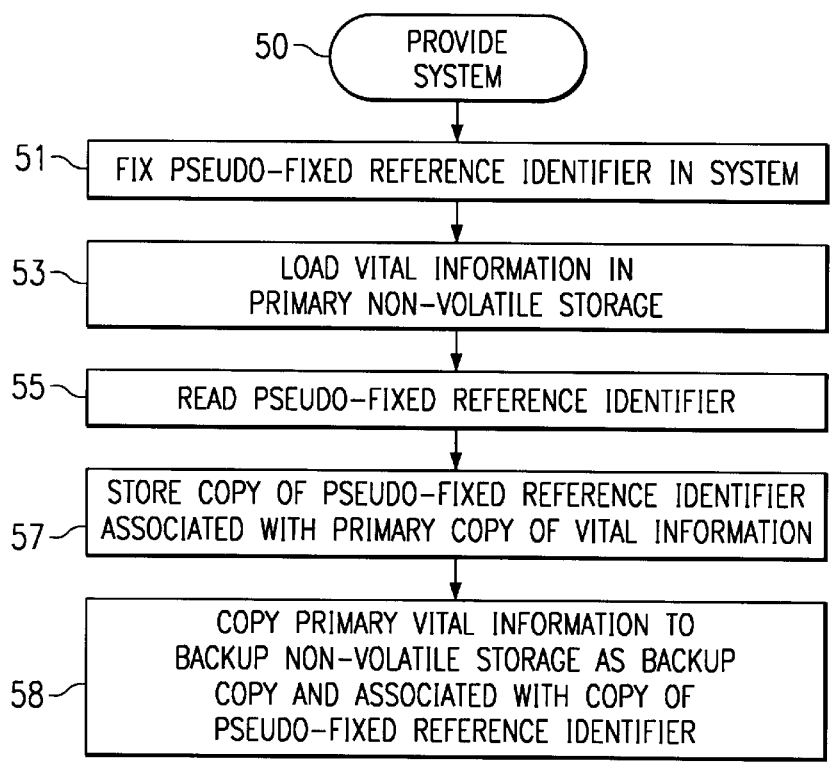

An embodiment of the method for providing the primary and backup copies of the vital information with the pseudo-fixed reference is illustrated in FIG. 6. With additional reference to FIGS. 1–5, the method begins when the system is provided, for example, with the production of the automated data storage library 10, such as, at a manufacturing facility, or during set up at a customer facility, in step 50.

In step 51, the pseudo-fixed reference is established. As different examples, the pseudo-fixed reference identifier 31 is fixed at accessor 18, pseudo-fixed reference identifier 32 is fixed at another processor 35, pseudo-fixed reference identifier 33 is fixed at the library controller, or machine readable serial number identifier 47 is fixed in the library mounted at a predetermined location of the frame of the library. The pseudo-fixed reference identifier 31, 32, 33 or machine readable serial number 47 is arranged to be separate from, but coupled to, the library controller processor 25 and the primary non-volatile memory 26.

In step 53, the vital information is loaded in the primary non-volatile storage 26, for example, with a manual process, such as from an operator panel 30, or as the result of set up, configuration, calibration, etc. Then, in step 55, the library controller reads the pseudo-fixed identifier. For example, the library controller operates the positionable reader 40 to read the machine readable serial number identifier 47, or directly reads the pseudo-fixed reference identifier 31, 32, or 33. The read pseudo-fixed reference identifier is then, in step 57, stored as a copy of the pseudo-fixed reference identifier associated with the vital information stored in the primary non-volatile storage 26. Lastly, in step 58, the primary copy of vital information with the pseudo-fixed reference identifier is copied to the backup non-volatile storage 34 as the backup copy. The primary or backup copy of the pseudo-fixed reference identifier may be stored in a separate field or separate memory device from the primary and/or backup copy, but should be part of the same replaceable part.

Thus, both the primary and the backup copies of the vital information start out as current, and, in accordance with the present invention, both have copies of the pseudo-fixed reference identifier.

Referring additionally to FIG. 7, as discussed above, a library controller computer processor 25 may be subject to a power-on reset situation 60 for any of several reasons, one of which may involve a replacement of the FRU containing the primary non-volatile store 26. Alternatively, the processor 25, or another processor requiring the vital information, as will be explained, may be reset without requiring a replacement of the FRU. As one example, the program code may be upgraded and "rebooted" without powering down the processor, and the processor is reset either automatically or by the operator upon the conclusion of the upgrade, in step 62. Thus, the reset is sensed by the processor in step 68. Herein, "reboot" may comprise (a) a power-on of a processor involving a power-on reset, (b) a manual reset of a processor, (c) a software instruction or command to cause a processor to run its boot code, or (d) any other initialization process resulting in altering an existing program and running the boot code.

In the example of the library having the machine readable serial number, in response to a power-on reset of the computer processor 25, the library controller, in step 61, operates the accessor 18 of the library to move the positionable reader 40 to substantially the predetermined location of the frame of the library where the machine readable serial number identifier 47 is mounted. In step 63, the positionable reader 40 is operated to read the machine readable serial number identifier 47. Alternatively, if the machine readable serial number is not the pseudo-fixed reference identifier, step 61 is skipped, and step 63 comprises directly reading the pseudo-fixed reference identifier 31, 32, 33.

Step 78 determines whether the positionable reader 40, in the reading step 63, was able to read the pseudo-fixed reference identifier 31, 32, 33, or 47. Examples of inability to read include failure of the coupling to the pseudo-fixed reference identifier 31, 32, 33, failure of the reader 40, or failure of the accessor 18 to move the reader 40 to the correct location, or the label is bad.

If the pseudo-fixed reference identifier 31, 32, 33, or 47 cannot be read, the process proceeds to step 77 which will be discussed hereinafter. If the pseudo-fixed reference identifier 31, 32, 33, or 47 was read in step 63, it is stored in memory, such as the RAM of processor 25, in step 64. This copy of the pseudo-fixed reference identifier may be temporarily stored in memory such that it is lost at a power off situation, and will again be read in step 63 after a power-on reset 60. The purpose of the temporarily stored read pseudo-fixed reference identifier will be discussed subsequently.

In step 65, the library controller compares the read pseudo-fixed reference identifier 31, 32, 33, or 47 to the primary stored copy of the pseudo-fixed reference identifier stored with the primary copy of vital information in the primary non-volatile storage 26 and to the copy of the pseudo-fixed reference identifier stored in the backup non-volatile storage 34, and step 66 determines whether the read pseudo-fixed reference identifier 31, 32, 33, or 47 matches the primary copy of the pseudo-fixed reference identifier.

If the read pseudo-fixed reference identifier 31, 32, 33, or 47 matches the copy of the pseudo-fixed reference identifier stored in the primary non-volatile storage 26, whether or not the read pseudo-fixed reference identifier matches the copy of the pseudo-fixed reference identifier stored in the backup non-volatile storage 34, as indicated by step 66, then, in step 67, the primary copy of vital information with the copy of the pseudo-fixed reference identifier is valid, and may be indicated as valid.

If the read pseudo-fixed reference identifier 31, 32, 33, or 47 and the primary copy of the pseudo-fixed reference identifier match, then the primary copy of the vital information is correct, an optional backup copy step 69 may be conducted to insure that the backup copy is also correct and is backed up correctly in the event the backup FRU was replaced, or in the event a change was made in the primary copy of the vital information, for example, by updating data stored with the primary copy. Copying the vital information to the backup, even if the vital information is unchanged, ensures that the backup copy is also up to date and correct. It is therefore possible to keep error data or usage data with the primary copy of vital information, and to constantly update that data, knowing that the backup copy of the vital information both is correct and is updated in step 69.

If the read pseudo-fixed reference identifier 31, 32, 33, or 47 matches only the copy of the pseudo-fixed reference identifier in the backup non-volatile storage 34, which means that the copy of the pseudo-fixed reference identifier of the primary non-volatile storage 26 does not match either the read pseudo-fixed reference identifier or the backup copy, as indicated by step 70, then, a signal is provided indicating that the backup copy of vital information with the copy of the pseudo-fixed reference identifier is to be restore copied to the primary non-volatile storage 26 as the primary copy in step 71. The restore copy function is thus conducted automatically, and the correct pseudo-fixed reference identifier is stored, associated with the restore copied primary copy of vital information.

In addition to, or as an alternative, a signal is provided in step 72 alerting an operator, for example, at the operator panel 30, that the backup copy matches the read pseudo-fixed reference identifier 31, 32, 33, or 47 while the primary does not. The operator may conduct a manual restore, if not done automatically, and may investigate the reason for the primary mismatching the read pseudo-fixed reference identifier 31, 32, 33, or 47.

If the read pseudo-fixed reference identifier 31, 32, 33, or 47 fails to match either the copy of the pseudo-fixed reference identifier stored in the primary non-volatile storage 26 or the copy of the pseudo-fixed reference identifier stored in the backup non-volatile storage 34, as indicated by the lack of matches in either step 66 or step 70, then, the process continues to step 77.

As discussed above, if the pseudo-fixed reference identifier 31, 32, 33, or 47 cannot be read, as indicated by step 78, the process continues to step 77. In step 77, the library controller compares the copy of the pseudo-fixed reference identifier stored in the primary non-volatile storage 26 to the copy of the pseudo-fixed reference identifier stored in the backup non-volatile storage 34.

If, as indicated by step 80, the copy of the pseudo-fixed reference identifier stored in the primary non-volatile storage 26 does not match the copy of the pseudo-fixed reference identifier stored in the backup non-volatile storage 34, the process continues at step 82. In step 82, the library controller 24 provides an error indication, e.g., to host system 28, and/or to the operator panel 30 to indicate that the vital information may be invalid. Step 81 is an optional step which stops applications that relate to direct operation of the library when the vital information may be invalid. Thus, step 81 effectively stops normal operation of the library 10, preventing potential data loss, and possible (but unlikely) damage to the library.

If, as indicated by step 80, the copy of the pseudo-fixed reference identifier stored in the primary non-volatile storage 26 matches the copy of the pseudo-fixed reference identifier stored in the backup non-volatile storage 34, the vital information appears valid, but the pseudo-fixed reference identifier 31, 32, 33, or 47 either does not match and may have been misread (from steps 66 and 70), or was not read (from step 78), and the process continues at step 87. In step 87, the library controller 24 may provide a warning indication, e.g., to host system 28, and/or to the operator panel 30. Thus, as indicted by step 86, the vital information is indicated as valid, and operation of the library is allowed to continue and is not prevented, since the vital information is valid. Alternatively, this could be considered as a stop condition.

As the result, the present invention provides verification of a primary or backup copy of vital information of an automated data storage library at each reset, when the vital information is subject to change.

Still referring to FIG. 7, additional verification of the validity of the vital information may be conducted either periodically as indicated by step 90, or upon a trigger signal as indicated by step 91. Either means of additional verification comprises an interim check when no power-on reset has occurred. Without a power-on reset, the library controller 24 has not been replaced; without a detected reset, the program code for the processor has not been changed, and, also, the pseudo-fixed reference identifier 31, 32, 33, or 47 has not been changed. Thus, the read pseudo-fixed reference identifier 31, 32, 33, or 47 temporarily stored in step 64 is employed in step 93 to eliminate the time otherwise required to move the positionable reader 40 to the machine readable serial number identifier 47, or to operate the system to read the pseudo-fixed reference identifier 31, 32, 33. In a preferred embodiment, without a power-on reset, the primary copy of vital information remains valid, as there is no opportunity to change it. The primary copy may be updated, as discussed above.

Step 90 may, for example, comprise a clock of the processor 25, which initiates the validating process on a periodic basis, such as on an hourly basis. Step 91 may, for example, comprise a signal resulting from an entry at the operator panel 30 by an operator as the result of a service menu option, or other service related trigger.

In response to step 90, or to step 91, the computer processor 25 repeats step 65, et seq. In the preferred embodiment, above, steps 70–87 are unlikely to be performed without a power-on reset, and backup update step 69 will consistently be performed.

As the result, the present invention provides verification of a primary and backup copy of vital information of a system, such as an automated data storage library, periodically (step 90) or at an appropriate occasion (step 91), and allows updating of the backup copy of vital information. This is useful in the situation where the primary copy of vital information is often updated.

Those of skill in the art will understand that the steps of FIGS. 6 and 7 may be reordered and that equivalent steps may be employed.

The present invention thus maintains the validity of the primary and backup copies of the vital information, and checks that validity as needed.

Figure 8:
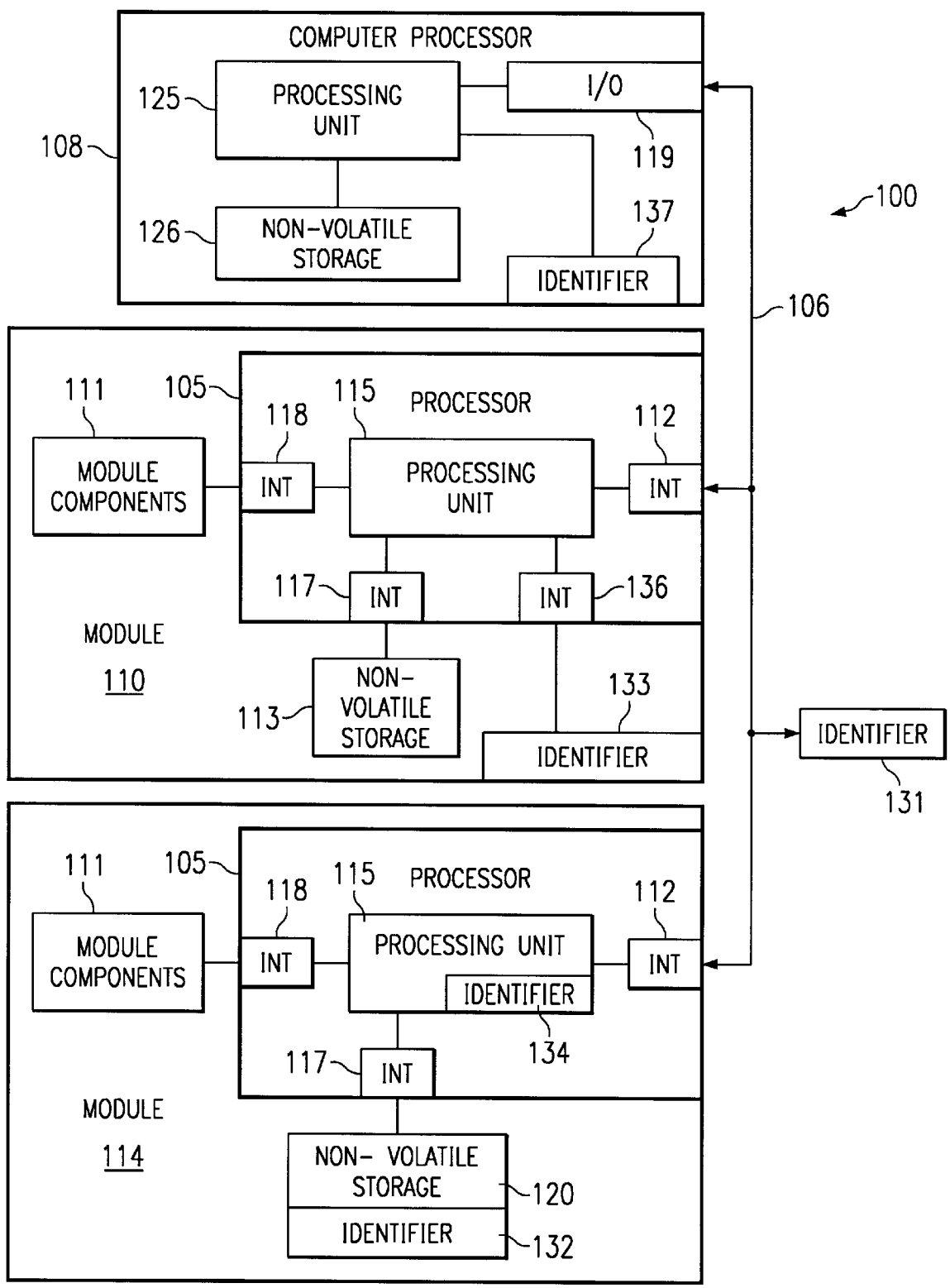
FIG. 8 is a block diagram of a multi-node processing network employing various examples of pseudo-fixed reference identifiers for conducting verification and backup and restore of vital information.

FIG. 8 illustrates alternative embedded systems which may employ the present invention to verify the primary and backup copies of vital information. An embedded system may comprise a multi-node processing network system 100 with a plurality of processors 105 coupled in a network 106, together with a controller or master processor 108. An example of a network comprises a multi-node system of embedded processors. The embedded system comprises a plurality of modules 110, 114 with processors at nodes of the system, and the network serves to interconnect the modules 110, 114 of the system, where the modules have programmable processors 105 to operate the modules and their components 111, thereby operating the system. In the illustrated example, the processors 105 each comprises a network interface 112 coupling the processor in the network, and a non-volatile memory 113, 120 such as a ROM, for storing code and information for operating the processor, and a processing unit 115 coupled to the non-volatile memory 113, 120 via an interface 117, to the module components 111 via an interface 118, and to the network interface 112.

The controller or master processor 108 comprises a master I/O interface 119 coupled in the network, a master processor 125 coupled to the master I/O interface, and a primary non-volatile storage 126 coupled to the master processor 125 which stores at least the primary copy of the vital information for the processors of the network. The master source may also comprise a functional node of the network with module components, etc.

A backup copy of the vital information is stored, for example, in non-volatile storage 113, which may comprise the non-volatile storage of processor 105 of module 110, or may comprise a separate non-volatile storage mounted on the same card.

Examples of embedded systems which require vital information include an aircraft "fly-by-wire" calibration system, a power generation system, a power distribution system, a distributed processor automotive system, and medical equipment.

In accordance with the present invention, the pseudo-fixed reference identifier may be located at a reference location of the processing system, separate from and coupled to the primary non-volatile storage 126, and separate from and coupled to the processing unit 125 of the computer processor 108, for example, comprising pseudo-fixed reference 131. As another example, the pseudo-fixed reference may be fixed at the non-volatile storage 120, unless that is the backup copy, comprising the pseudo-fixed reference 132, or may be fixed as the pseudo-fixed reference 134 which is directly coupled to the processing unit 115 of module 114. A still further example comprises pseudo-fixed reference 133 which is coupled to processing unit 115 of module 110 by means of an interface 136. The pseudo-fixed references 131, 132, 134 and 133 are separate from and coupled to the primary non-volatile memory 126 and the processing unit 125 of the processor 108 by means of network 106. Another example of a pseudo-fixed reference 137 is directly coupled to processing unit 125 of the processor 108.

The function of the pseudo-fixed references to provide verification of the vital information is essentially the same as described with respect to FIGS. 6 and 7. As an example, in the processing system of a multi-node system, a pseudo-fixed reference identifier 131, 132, 133, 134, or 137 is provided at a reference location 131, 120, 105, 115, or 137 of the processing system. Primary non-volatile storage 126 is provided at a node of the processing system, and is separate from and coupled to the reference location, for storing a primary copy of vital information, and for storing a copy of the pseudo-fixed reference identifier associated with the primary copy of the vital information. Backup non-volatile storage 113 is provided in the processing system, coupled to the primary non-volatile storage 126, via network 106 for storing a backup copy of the vital information, the backup copy copied from the primary copy of vital information with a copy of the pseudo-fixed reference identifier. A processor 108 is coupled to the reference location 131, 120, 105, 115, or 137, the primary non-volatile storage 126 and the backup non-volatile storage 113, and, in accordance with an embodiment of a processor implemented method, the processor, upon a reset identified by the processor, reads the pseudo-fixed reference identifier 131, 132, 133, 134, or 137 from the reference location 131, 120, 105, 115, or 137. The processor compares the read pseudo-fixed reference identifier 131, 132, 133, 134, or 137 to the stored copies of the pseudo-fixed reference identifier of the primary non-volatile storage 126 and the backup non-volatile storage 113. If the read pseudo-fixed reference identifier 131, 132, 133, 134, or 137 matches the primary stored copy of the pseudo-fixed reference identifier, the processor indicates that the vital information is valid. The processor may optionally copy the primary copy of vital information with the copy of the pseudo-fixed reference identifier to the backup non-volatile storage 113 as an updated backup copy, as discussed above. If the read pseudo-fixed reference identifier 131, 132, 133, 134, or 137 matches the backup stored copy of the pseudo-fixed reference identifier only, the processor indicates that the backup copy of the vital information is to be restore copied to the primary non-volatile storage as the primary copy.

There is a remote possibility that a FRU containing the primary non-volatile storage could be swapped out for a different FRU, and, at some later date, swapped back in, still storing old vital information and associated with the correct pseudo-fixed reference identifier. To prevent use of the old vital information, the technician is provided the opportunity to change or delete the content of the storage representing the pseudo-fixed reference identifier of a new FRU, before the comparison is conducted.

FIGS. 9–13 comprise examples of pseudo-fixed reference identifiers.

Figure 9:
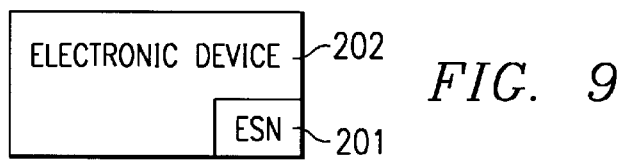
FIGS. 9–13 comprise examples of pseudo-fixed reference identifiers.

Specifically, FIG. 9 illustrates an example of an electronically readable "electronic serial number" 201 fixed in an electronic module 202 of the reference location. At the present time, commercially available non-volatile memory modules from Dallas Semiconductor may be provided with an "electronic serial number".

Figure 10:
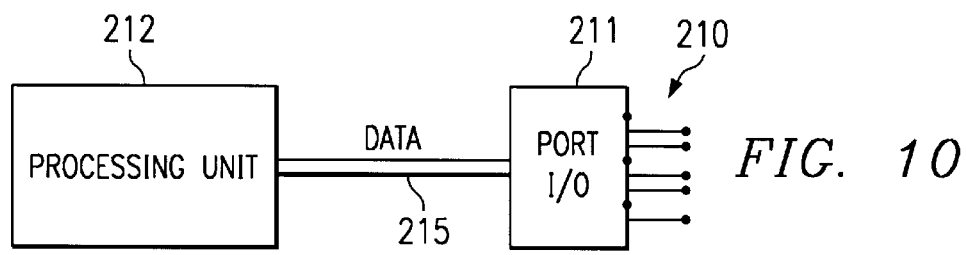

FIG. 10 illustrates an arrangement of I/O pins 210 at the reference location, such as at a port I/O 211 of a processing unit 212, the port I/O coupled to the data bus 215 of the processing unit. Alternatively, the I/O pins may be directly connected to the processor rather than linked to the data bus. As is known to those of skill in the art, the I/O pins 210 may comprise dedicated I/O pins, either directly wired or with jumpers hung on the pins, or may comprise a tri-state buffer or gate which is addressed by the processing unit by means of a "chip select" or address on a bus.

Figure 11:
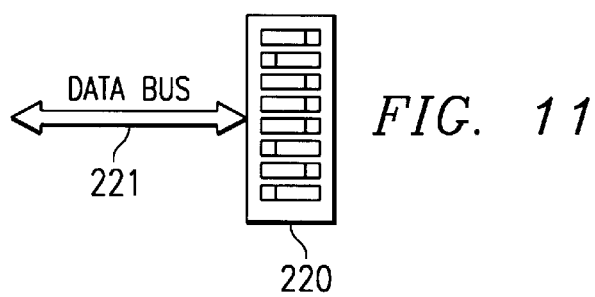
Figure 12:
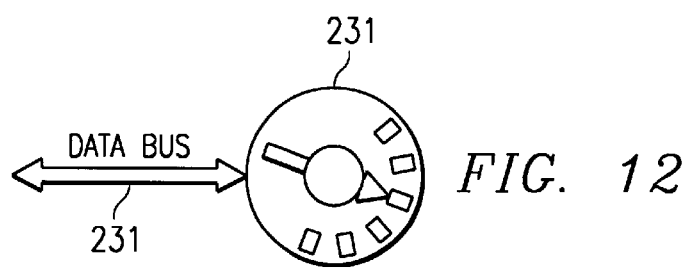

FIG. 11 illustrates one example of settable switches of an electronic module at the reference location. In the example of FIG. 11, the settable switches comprise manually settable "DIP" switches 220, such as are found in many processing units, and typically coupled to a data bus 221. Another example of settable switches is illustrated in FIG. 12, comprising manually settable multi-position switches 230. As is known to those of skill in the art, such switches are typically hexadecimal switches directly readable on the bus, such as bus 231. Alternatively, the switches may be coupled to a bus on the board of a processor.

Figure 13:
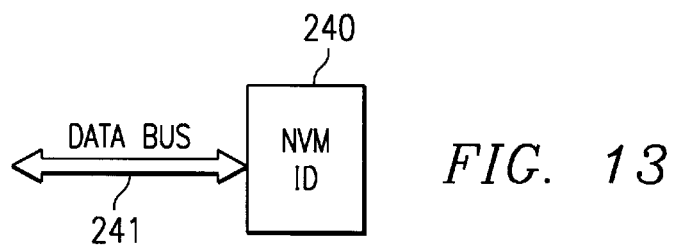

FIG. 13 illustrates a non-volatile memory 240 at the reference location coupled to a bus 241. Many examples of such devices are known to those of skill in the art, such as a PROM, battery back-up RAM, field programmable gate array, or ASIC. The non-volatile memory should be not subject to update or change in normal operation.

The pseudo-fixed reference identifiers need not comprise actual serial numbers of the specific devices or system in which they are located. Rather, the pseudo-fixed reference identifiers may comprise a software-generated pseudo-random number. For example, many compilers support a random number generator, or one can be built using code that can be implemented simply. Alternatively, the pseudo-random number generator may comprise an output from a millisecond timer running, for example, since the power-on of the system. Specifically, such a timer may comprise 32 bits, which provides for 4 billion possible numbers. Thus, at first power on of the ROM, the current output of the random number generator may be read and utilized as the pseudo-fixed reference identifier.

If the non-volatile memory gets swapped out, or is deleted, for example, a battery powered non-volatile RAM loses power, the primary and backup non-volatile storage copies of the pseudo-fixed reference identifier may be compared, and, if they match, the pseudo-fixed reference identifier is replaced in the non-volatile RAM.

The output of a random number generator may also be obtained by a manufacturing technician and employed for setting the settable "DIP" switches 220 of FIG. 11, or the settable multi-position switches 230 of FIG. 12.

Additionally, the pseudo-fixed reference identifiers comprising the sensible indicators illustrated in FIGS. 1, 3, 4, 5A and 5B may be printed or generated employing a random number generator. Further, if a Ethernet controller is present, the pseudo-fixed reference identifier may comprise the MAC address of the controller.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for verifying primary and backup copies of vital information for an automated data storage library, said library having a plurality of storage shelves for storing data storage media, at least one accessor for accessing said data storage media in said plurality of storage shelves, a machine readable serial number identifier, a positionable reader for reading said machine readable serial number identifier, primary and backup non-volatile storage for storing said primary and said backup copies of said vital information, and a library controller comprising at least one processor, said library controller coupled to said accessor, said positionable reader, and to said primary and backup non-volatile storage, said library controller additionally storing programs for operating said library in accordance with said vital information, said method comprising the steps of:

storing said serial number identifier associated with said primary copy of said vital information of said primary non-volatile storage;

copying said primary copy of vital information to said backup non-volatile storage as said backup copy associated with said serial number identifier;

upon a power-on reset of said processor, operating said positionable reader to read said machine readable serial number identifier;

comparing said read serial number identifier to said stored serial number identifiers of said primary non-volatile storage and said backup non-volatile storage;

if said read serial number identifier matches said primary stored serial number identifier, indicating said primary copy of vital information is valid; and if said read serial number identifier matches said backup stored serial number identifier only, indicating restore copying of said backup copy of vital information to said primary non-volatile storage as said primary copy associated with said serial number identifier.

2. The method of claim 1, additionally comprising the step of, if, in said comparing step, said read serial number identifier matches said primary stored serial number identifier, copying said primary copy of vital information with said serial number identifier to said backup non-volatile storage as said backup copy.

3. The method of claim 1, additionally comprising the step of, if, in said comparing step, said read serial number identifier fails to match either said primary or said backup stored serial number identifiers, comparing said primary and said backup stored serial number identifiers, and:

if said primary stored serial number identifier fails to match said backup stored serial number identifier, providing an error indication; and if said primary stored serial number identifier matches said backup stored serial number identifier, continuing operation of said library.

4. The method of claim 1, wherein said positionable reader, in said operating step, fails to read said machine readable serial number identifier, said method additionally comprising the step of:

comparing said primary and said backup stored serial number identifiers, and:

if said primary stored serial number identifier fails to match said backup stored serial number identifier, providing an error indication; and if said primary stored serial number identifier matches said backup stored serial number identifier, continuing operation of said library.

5. The method of claim 1, additionally comprising the steps of:

temporarily storing said machine readable serial number identifier read by said positionable reader;

periodically comparing said stored read serial number identifier to said stored serial number identifiers of said primary non-volatile storage and said backup non-volatile storage, and:

if said read serial number identifier matches said primary stored serial number identifier, backup copying said primary copy of vital information with said serial number identifier to said backup non-volatile storage as said backup copy.

6. The method of claim 5, additionally comprising the step of responding to an input trigger signal, conducting said comparing step.

7. An automated data storage library comprising:

a plurality of storage shelves for storing data storage media;

at least one accessor for accessing said data storage media in said plurality of storage shelves;

a machine readable serial number identifier positioned at said library;

a positionable reader for reading said machine readable serial number identifier;

primary non-volatile storage for storing a primary copy of said vital information, said serial number identifier stored associated with said primary copy of said vital information of said primary non-volatile storage;

backup non-volatile storage for storing a backup copy of said vital information, said backup copy copied from said primary copy of vital information and associated with said serial number identifier; and a library controller comprising at least one processor associated with said primary non-volatile storage, said library controller coupled to said accessor, said positionable reader, and to said primary and backup non-volatile storage, said library controller storing programs for operating said library in accordance with said vital information, said library controller:

upon a power-on reset of said processor, operates said positionable reader to read said machine readable serial number identifier;

compares said read serial number identifier to said stored serial number identifiers of said primary non-volatile storage and said backup non-volatile storage;

if said read serial number identifier matches said primary stored serial number identifier, indicates said primary copy of vital information is valid; and if said read serial number identifier matches said backup stored serial number identifier only, indicates restore copying of said backup copy of vital information to said primary non-volatile storage as said primary copy associated with said serial number identifier.

8. The automated data storage library of claim 7, wherein said library controller, in comparing said read serial number identifier to said stored serial number identifiers of said primary non-volatile storage and said backup non-volatile storage, wherein said read serial number identifier matches said primary stored serial number identifier, copies said primary copy of vital information with said serial number identifier to said backup non-volatile storage as said backup copy.

9. The automated data storage library of claim 7, wherein said library controller, in comparing said read serial number identifier to said stored serial number identifiers of said primary non-volatile storage and said backup non-volatile storage, wherein said read serial number identifier fails to match either said primary or said backup stored serial number identifiers, additionally compares said primary and said backup stored serial number identifiers, and:

if said primary stored serial number identifier fails to match said backup stored serial number identifier, provides an error indication; and if said primary stored serial number identifier matches said backup stored serial number identifier, continues operation of said library.

10. The automated data storage library of claim 7, wherein said positionable reader fails to read said machine readable serial number identifier, said library controller additionally:

compares said primary and said backup stored serial number identifiers, and:

if said primary stored serial number identifier fails to match said backup stored serial number identifier, provides an error indication; and if said primary stored serial number matches said backup stored serial number identifier, continues operation of said library.

11. The automated data storage library of claim 7, wherein said library controller additionally:
- temporarily stores said machine readable serial number identifier read by said positionable reader;
- periodically compares said stored read serial number identifier to said stored serial number identifiers of said primary non-volatile storage and said backup non-volatile storage, and:
  - if said read serial number identifier matches said primary stored serial number identifier, backup copies said primary copy of vital information with said serial number identifier to said backup non-volatile storage as said backup copy.

12. The automated data storage library of claim 11, wherein said library controller is additionally coupled to an input, and is responsive to a trigger signal received at said input, conducting said comparison function.

13. The automated data storage library of claim 7, wherein said machine readable serial number identifier comprises a bar code label positioned at a predetermined location of said library, wherein said positionable reader is mounted at said accessor, and wherein said library controller, upon said power-on reset, operates said accessor to position said positionable reader at substantially said predetermined location to read said bar code label machine readable serial number identifier.

14. The automated data storage library of claim 7, wherein said machine readable serial number identifier comprises a contactless transceiver positioned at a predetermined location of said library, wherein said positionable reader is mounted at said accessor, and wherein said library controller, upon said power-on reset, operates said accessor to position said positionable reader at substantially said predetermined location to read said machine readable serial number identifier transmitted by said contactless transceiver.

15. A program product usable with a programmable processor having processor readable program code embodied therein, for verifying primary and backup copies of vital information for an automated data storage library, said library storing data storage media; said library having a plurality of storage shelves for storing data storage media; at least one accessor for accessing said data storage media in said plurality of storage shelves; a machine readable serial number identifier; a positionable reader for reading said machine readable serial number identifier; primary and backup non-volatile storage for storing said primary and backup copies of said vital information, said serial number identifier stored associated with said primary copy of said vital information of said primary non-volatile storage, said backup copy copied from said primary copy of vital information to said backup non-volatile storage and associated with said serial number identifier; and a library controller coupled to said accessor, said positionable reader, and to said primary and backup non-volatile storage, said library controller comprising at least one processor storing programs for operating said library in accordance with said vital information; said program product comprising:
- processor readable program code which causes said at least one library controller processor to, upon a power-on reset of said processor, operate said positionable reader to read said machine readable serial number identifier;
- processor readable program code which causes said at least one library controller processor to compare said read serial number identifier to said stored serial number identifiers of said primary non-volatile storage and said backup non-volatile storage; and
- processor readable program code which causes said at least one library controller processor, if said read serial number identifier matches said primary stored serial number identifier, to indicate said primary copy of vital information is valid; and, if said read serial number identifier matches said backup stored serial number identifier only, to indicate restore copying of said backup copy of vital information to said primary non-volatile storage as said primary copy associated with said serial number identifier.

16. The program product of claim 15, wherein said processor readable program code which causes said at least one library controller processor to compare said read serial number identifier to said stored serial number identifiers of said primary non-volatile storage and said backup non-volatile storage, wherein said read serial number identifier matches said primary stored serial number identifier, additionally causes said at least one library controller processor to copy said primary copy of vital information with a copy of said serial number identifier to said backup non-volatile storage as said backup copy.

17. The program product of claim 15, wherein said processor readable program code which causes said at least one library controller processor to compare said read serial number identifier to said stored serial number identifiers of said primary non-volatile storage and said backup non-volatile storage, wherein said read serial number identifier fails to match either said primary or said backup stored serial number identifiers, additionally causes said at least one library controller processor to compare said primary and said backup stored serial number identifiers, and:
- if said primary stored serial number identifier fails to match said backup stored serial number identifier, to provide an error indication; and
- if said primary stored serial number identifier matches said backup stored serial number identifier, to continue operation of said library.

18. The program product of claim 15, wherein said positionable reader fails to read said machine readable serial number identifier, said processor readable program code additionally causes said at least one library controller processor to compare said primary and said backup stored serial number identifiers, and:
- if said primary stored serial number identifier fails to match said backup stored serial number identifier, to provide an error indication; and
- if said primary stored serial number identifier matches said backup stored serial number identifier, to continue operation of said library.

19. The program product of claim 15, wherein said processor readable program code additionally causes said at least one library controller processor to:
- temporarily store said machine readable serial number identifier read by said positionable reader;
- periodically compare said stored read serial number identifier to said stored serial number identifiers of said primary non-volatile storage and said backup non-volatile storage, and:
  - if said read serial number identifier matches said primary stored serial number identifier, to copy said primary copy of vital information with said serial number identifier to said backup non-volatile storage as said backup copy.

20. The program product of claim 19, wherein said library controller is additionally coupled to an input, and wherein said processor readable program code additionally causes said at least one library controller processor to respond to a trigger signal received at said input, conducting said comparison function.

21. A method for verifying primary and backup copies of vital information for an automated data storage library; said library having a plurality of storage shelves for storing data storage media; at least one accessor for accessing said data storage media in said plurality of storage shelves; a machine readable serial number identifier; a positionable reader for reading said machine readable serial number identifier; primary and backup non-volatile storage for storing primary and backup copies of said vital information, a copy of said serial number identifier stored associated with said primary copy of said vital information of said primary non-volatile storage, said backup copy copied from said primary copy of vital information to said backup non-volatile storage and associated with said serial number identifier; and a library controller comprising at least one computer processor associated with said primary non-volatile storage, said library controller coupled to said accessor, said positionable reader, and to said primary and backup non-volatile storage, said library controller additionally storing programs for operating said library in accordance with said vital information; said method comprising the steps of:

upon a power-on reset of said computer processor, operating said positionable reader to read said machine readable serial number identifier;

comparing said read serial number identifier to said stored serial number identifiers of said primary non-volatile storage and said backup non-volatile storage;

if said read serial number identifier matches said primary stored serial number identifier, indicating said primary copy of vital information is valid; and if said read serial number identifier matches said backup stored serial number identifier only, indicating restore copying of said backup copy of vital information to said primary non-volatile storage as said primary copy associated with said serial number identifier.

22. The method of claim 21, additionally comprising the step of, if, in said comparing step, said read serial number identifier matches said primary stored serial number identifier, copying said primary copy of vital information with a copy of said serial number identifier to said backup non-volatile storage as said backup copy.

23. The method of claim 22, additionally comprising the step of, if, in said comparing step, said read serial number fails to match either said primary or said backup stored serial number identifiers, comparing said primary and said backup stored identifiers, and:

if said primary stored serial number identifier fails to match said backup stored serial number identifier, providing an error indication; and if said primary stored serial number identifier matches said backup stored serial number identifier, continuing operation of said library.

24. The method of claim 21, wherein said positionable reader, in said operating step, fails to read said machine readable serial number identifier, said method additionally comprising the step of:

comparing said primary and said backup stored serial number identifiers, and:

if said primary stored serial number identifier fails to match said backup stored serial number identifier, providing an error indication; and if said primary stored serial number identifier matches said backup stored serial number identifier, continuing operation of said library.

25. The method of claim 21, additionally comprising the steps of:

temporarily storing said machine readable serial number identifier read by said positionable reader;

periodically comparing said stored read serial number identifier to said stored serial number identifiers of said primary non-volatile storage and said backup non-volatile storage, and:

if said read serial number identifier matches said primary stored serial number identifier, copying said primary copy of vital information with said serial number identifier to said backup non-volatile storage as said backup copy.

26. The method of claim 25, additionally comprising the step of responding to an input trigger signal, conducting said comparing step.

27. A method for verifying primary and backup copies of vital information for a processing system, said system having at least one processor and having primary and backup non-volatile storage for storing said primary and said backup copies of said vital information, said method comprising the steps of:

providing a pseudo-fixed reference identifier separate from and coupled to said at least one processor;

storing a copy of said pseudo-fixed reference identifier associated with said primary copy of said vital information of said primary non-volatile storage;

copying said primary copy of vital information to said backup non-volatile storage as said backup copy associated with a copy of said pseudo-fixed reference identifier;

upon a reset identified by said processor, reading said pseudo-fixed reference identifier;

comparing said read pseudo-fixed reference identifier to said stored copies of said pseudo-fixed reference identifier of said primary non-volatile storage and said backup non-volatile storage;

if, in said comparing step, said read pseudo-fixed reference identifier matches said primary stored copy of said pseudo-fixed reference identifier, indicating said vital information is valid; and if, in said comparing step, said read pseudo-fixed reference identifier matches said backup stored copy of said pseudo-fixed reference identifier only, indicating restore copying of said backup copy of vital information to said primary non-volatile storage as said primary copy associated with said copy of said pseudo-fixed reference identifier.

28. The method of claim 27, wherein said valid indicating step additionally comprises copying said primary copy of vital information with a copy of said pseudo-fixed reference identifier to said backup non-volatile storage as said backup copy.

29. The method of claim 27, additionally comprising the step of, if, in said comparing step, said read pseudo-fixed reference identifier fails to match either said primary or said backup stored copies of said pseudo-fixed reference identifier, comparing said primary and said backup stored copies of said pseudo-fixed reference identifier, and:

if said primary stored copy of said pseudo-fixed reference identifier fails to match said backup stored copy of said pseudo-fixed reference identifier, providing an error indication; and if said primary stored copy of said pseudo-fixed reference identifier matches said backup stored copy of said pseudo-fixed reference identifier, indicating said vital information is valid.

30. The method of claim 27, wherein, upon said reading step failing to read said pseudo-fixed reference identifier, said method additionally comprising the step of:
   comparing said primary and said backup copies of said stored serial number identifier, and:
      if said primary stored copy of said serial number identifier fails to match said backup stored copy of said serial number identifier, providing an error indication; and
      if said primary stored copy of said pseudo-fixed reference identifier matches said backup stored copy of said pseudo-fixed reference identifier, indicating said vital information is valid.

31. The method of claim 27, additionally comprising the steps of:
   periodically reading said pseudo-fixed reference identifier;
   comparing said read pseudo-fixed reference identifier to said stored copies of said pseudo-fixed reference identifiers of said primary non-volatile storage and said backup non-volatile storage, and:
      if said read pseudo-fixed reference identifier matches said primary stored copy of said pseudo-fixed reference identifier, copying said primary copy of vital information with said copy of said pseudo-fixed reference identifier to said backup non-volatile storage as said backup copy.

32. The method of claim 31, additionally comprising the step of responding to an input trigger signal, conducting said periodically reading step.

33. A multi-node processing system comprising:
   a pseudo-fixed reference identifier at a reference location of said processing system;
   primary non-volatile storage at a node of said processing system, and separate from and coupled to said reference location, for storing a primary copy of vital information, and for storing a copy of said pseudo-fixed reference identifier associated with said primary copy of said vital information in said primary non-volatile storage;
   backup non-volatile storage in said processing system coupled to said primary non-volatile storage node, for storing a backup copy of said vital information, said backup copy copied from said primary copy of vital information and associated with a copy of said pseudo-fixed reference identifier; and
   at least one processor coupled to said reference location, said primary non-volatile storage and said backup non-volatile storage, said processor:
      upon a reset identified by said processor, reads said pseudo-fixed reference identifier from said reference location;
      compares said read pseudo-fixed reference identifier to said stored copies of said pseudo-fixed reference identifier of said primary non-volatile storage and said backup non-volatile storage;
      if said read pseudo-fixed reference identifier matches said primary stored copy of said pseudo-fixed reference identifier, indicates said vital information is valid; and
      if said read pseudo-fixed reference identifier matches said backup stored copy of said pseudo-fixed reference identifier only, indicates restore copying of said backup copy of vital information to said primary non-volatile storage as said primary copy associated with said copy of said pseudo-fixed reference identifier.

34. The multi-node processing system of claim 33, wherein said processor, in indicating said vital information is valid, additionally copies said primary copy of vital information with a copy of said pseudo-fixed reference identifier to said backup non-volatile storage as said backup copy.

35. The multi-node processing system of claim 33, wherein said processor, in comparing said read pseudo-fixed reference identifier to said stored copies of said pseudo-fixed reference identifier of said primary non-volatile storage and said backup non-volatile storage, wherein said read pseudo-fixed reference identifier fails to match either said primary or said backup stored copy of said pseudo-fixed reference identifier, additionally compares said primary and said backup stored copies of said pseudo-fixed reference identifier, and:
   if said primary stored copy of said pseudo-fixed reference identifier fails to match said backup stored copy of said pseudo-fixed reference identifier, provides an error indication; and
   if said primary stored copy of said pseudo-fixed reference identifier matches said backup stored copy of said pseudo-fixed reference identifier, indicates said vital information is valid.

36. The multi-node processing system of claim 33, wherein said processor fails to read said pseudo-fixed reference identifier, said processor additionally:
   compares said primary and said backup stored copies of said pseudo-fixed reference identifier, and:
      if said primary stored copy of said pseudo-fixed reference identifier fails to match said backup stored copy of said pseudo-fixed reference identifier, provides an error indication; and
      if said primary stored copy of said pseudo-fixed reference identifier matches said backup stored copy of said pseudo-fixed reference identifier, indicates said vital information is valid.

37. The multi-node processing system of claim 33, wherein said processor additionally:
   periodically reads said pseudo-fixed reference identifier;
   compares said read pseudo-fixed reference identifier to said stored copies of said pseudo-fixed reference identifier of said primary non-volatile storage and said backup non-volatile storage, and:
      if said read pseudo-fixed reference identifier matches said primary stored copy of said pseudo-fixed reference identifier, backup copies said primary copy of vital information with said copy of said pseudo-fixed reference identifier to said backup non-volatile storage as said backup copy.

38. The multi-node processing system of claim 37, wherein said multi-node processing system additionally comprises an input, and wherein said processor is responsive to a trigger signal received at said input, conducting said comparison function.

39. The multi-node processing system of claim 33, wherein said pseudo-fixed reference identifier comprises an electronically readable "electronic serial number" fixed in an electronic module of said reference location.

40. The multi-node processing system of claim 33, wherein said pseudo-fixed reference comprises an arrangement of I/O pins at said reference location.

41. The multi-node processing system of claim 33, wherein said pseudo-fixed reference comprises settable switches of an electronic module at said reference location.

42. The multi-node processing system of claim 41, wherein said settable switches of said pseudo-fixed reference comprise manually settable "DIP" switches.

43. The multi-node processing system of claim 41, wherein said settable switches of said pseudo-fixed reference comprise manually settable multi-position switches.

44. The multi-node processing system of claim 33, wherein said pseudo-fixed reference comprises a non-volatile memory at said reference location.

45. The multi-node processing system of claim 33, wherein said pseudo-fixed reference comprises a reader and a sensible indicator readable by said reader.

46. A program product usable with a programmable processor having processor readable program code embodied therein, for verifying primary and backup copies of vital information associated with said programmable processor, said primary and backup copies of vital information stored respectively in primary and backup non-volatile storage coupled to said programmable processor; said programmable processor coupled to a pseudo-fixed reference identifier separate from said primary non-volatile storage and from said programmable processor, a copy of said pseudo-fixed reference identifier stored associated with said primary copy of said vital information of said primary non-volatile storage, said backup copy copied from said primary copy of vital information to said backup non-volatile storage and associated with a copy of said pseudo-fixed reference identifier; said program product comprising:

processor readable program code which causes said programmable processor to, upon a reset identified by said programmable processor, read said pseudo-fixed reference identifier;

processor readable program code which causes said programmable processor to compare said read pseudo-fixed reference identifier to said stored copies of said pseudo-fixed reference identifier of said primary non-volatile storage and said backup non-volatile storage; and processor readable program code which causes said programmable processor to, if said read pseudo-fixed reference identifier matches said primary stored copy of said pseudo-fixed reference identifier, indicate said vital information is valid;

if said read pseudo-fixed reference identifier matches said backup stored copy of said pseudo-fixed reference identifier only, causes said programmable processor to indicate restore copying of said backup copy of vital information to said primary non-volatile storage as said primary copy associated with said copy of said pseudo-fixed reference identifier.

47. The program product of claim 46, wherein said processor readable program code which causes said programmable processor to indicate said vital information is valid, additionally causes said programmable processor to copy said primary copy of vital information with a copy of said pseudo-fixed reference identifier to said backup non-volatile storage as said backup copy.

48. The program product of claim 46, wherein said processor readable program code which causes said programmable processor to compare said read pseudo-fixed reference identifier to said stored copies of said pseudo-fixed reference identifier of said primary non-volatile storage and said backup non-volatile storage, wherein said read pseudo-fixed reference identifier fails to match either said primary or said backup stored copies of said pseudo-fixed reference identifier, additionally causes said programmable processor to compare said primary and said backup stored copies of said pseudo-fixed reference identifier, and:

if said primary stored copy of said pseudo-fixed reference identifier fails to match said backup stored copy of said pseudo-fixed reference identifier, to provide an error indication; and if said primary stored copy of said pseudo-fixed reference identifier matches said backup stored copy of said pseudo-fixed reference identifier, to indicate said vital information is valid.

49. The program product of claim 46, wherein said programmable processor fails to read said pseudo-fixed reference identifier, said processor readable program code additionally causes said programmable processor to compare said primary and said backup stored copies of said pseudo-fixed reference identifier, and:

if said primary stored copy of said pseudo-fixed reference identifier fails to match said backup stored copy of said pseudo-fixed reference identifier, to provide an error indication; and if said primary stored copy of said pseudo-fixed reference identifier matches said backup stored copy of said pseudo-fixed reference identifier, to indicate said vital information is valid.

50. The program product of claim 46, wherein said processor readable program code additionally causes said programmable processor to:

periodically read said pseudo-fixed reference identifier read by said positionable reader;

compare said read pseudo-fixed reference identifier to said stored copies of said pseudo-fixed reference identifier of said primary non-volatile storage and said backup non-volatile storage, and:

if said read pseudo-fixed reference identifier matches said primary stored copy of said pseudo-fixed reference identifier, to copy said primary copy of vital information with said copy of said pseudo-fixed reference identifier to said backup non-volatile storage as said backup copy.

51. The program product of claim 50, wherein said programmable processor is additionally coupled to an input, and wherein said processor readable program code additionally causes said programmable processor to respond to a trigger signal received at said input, conducting said comparison function.

52. A processor coupled to primary non-volatile storage, and to backup non-volatile storage, said primary non-volatile storage for storing a primary copy of vital information, said backup non-volatile storage for storing a backup copy of said vital information, said processor comprising:

a pseudo-fixed reference identifier at a reference location;

a processor element coupled to and separate from said reference location, and coupled to said primary and said backup non-volatile storage, said processor element:

storing a copy of said pseudo-fixed reference identifier associated with said primary copy of said vital information of said primary non-volatile storage;

storing a backup copy of said vital information in said backup non-volatile storage, said backup copy copied from said primary copy of vital information and associated with a copy of said pseudo-fixed reference identifier;

upon a reset identified by said processor, reading said pseudo-fixed reference identifier from said reference location;

comparing said read pseudo-fixed reference identifier to said stored copies of said pseudo-fixed reference identifier of said primary non-volatile storage and said backup non-volatile storage; and if said read pseudo-fixed reference identifier matches said primary stored copy of said pseudo-fixed reference identifier, indicates said vital information is valid; and if said read pseudo-fixed reference identifier matches said backup stored copy of said pseudo-fixed reference identifier only, indicates restore copying of said backup copy of vital information to said primary non-volatile storage as said primary copy associated with said copy of said pseudo-fixed reference identifier.

53. The processor of claim 52, wherein said processor element, in indicating said vital information is valid, additionally copies said primary copy of vital information with a copy of said pseudo-fixed reference identifier to said backup non-volatile storage as said backup copy.

54. The processor of claim 52, wherein said processor element, in comparing said read pseudo-fixed reference identifier to said stored copies of said pseudo-fixed reference identifier of said primary non-volatile storage and said backup non-volatile storage, wherein said read pseudo-fixed reference identifier fails to match either said primary or said backup stored copy of said pseudo-fixed reference identifier, additionally compares said primary and said backup stored copies of said pseudo-fixed reference identifier, and:

if said primary stored copy of said pseudo-fixed reference identifier fails to match said backup stored copy of said pseudo-fixed reference identifier, provides an error indication; and if said primary stored copy of said pseudo-fixed reference identifier matches said backup stored copy of said pseudo-fixed reference identifier, indicates said vital information is valid.

55. The processor of claim 52, wherein said processor element fails to read said pseudo-fixed reference identifier, said processor element additionally:

compares said primary and said backup stored copies of said pseudo-fixed reference identifier, and:

if said primary stored copy of said pseudo-fixed reference identifier fails to match said backup stored copy of said pseudo-fixed reference identifier, provides an error indication; and if said primary stored copy of said pseudo-fixed reference identifier matches said backup stored copy of said pseudo-fixed reference identifier, indicates said vital information is valid.

56. The processor of claim 52, wherein said processor element additionally:

periodically reads said pseudo-fixed reference identifier;

compares said read pseudo-fixed reference identifier to said stored copies of said pseudo-fixed reference identifier of said primary non-volatile storage and said backup non-volatile storage, and:

if said read pseudo-fixed reference identifier matches said primary stored copy of said pseudo-fixed reference identifier, backup copies said primary copy of vital information with said copy of said pseudo-fixed reference identifier to said backup non-volatile storage as said backup copy.

57. The processor of claim 56, wherein said processor additionally comprises an input, and wherein said processor element is responsive to a trigger signal received at said input, conducting said comparison function.

58. The processor of claim 52, wherein said pseudo-fixed reference identifier comprises an electronically readable "electronic serial number" fixed in an electronic module of said reference location.

59. The processor of claim 52, wherein said pseudo-fixed reference comprises an arrangement of I/O pins at said reference location.

60. The processor of claim 52, wherein said pseudo-fixed reference comprises settable switches of an electronic module at said reference location.

61. The processor of claim 60, wherein said settable switches of said pseudo-fixed reference comprise manually settable "DIP" switches.

62. The processor of claim 60, wherein said settable switches of said pseudo-fixed reference comprise manually settable multi-position switches.

63. The processor of claim 52, wherein said pseudo-fixed reference comprises a non-volatile memory at said reference location.

64. The processor of claim 52, wherein said pseudo-fixed reference comprises a reader and a sensible indicator readable by said reader.

65. A modular processing system comprising:

a plurality of functional modules, each operated by at least one processor;

a pseudo-fixed reference identifier at a reference location of said modular processing system;

primary non-volatile storage at a node of said processing system, and separate from and coupled to said reference location, for storing a primary copy of vital information, and for storing a copy of said pseudo-fixed reference identifier associated with said primary copy of said vital information of said primary non-volatile storage, wherein at least one of said processors operates an associated functional module in accordance with said vital information;

backup non-volatile storage in said processing system coupled to said primary non-volatile storage, for storing a backup copy of said vital information, said backup copy copied from said primary copy of vital information and associated with a copy of said pseudo-fixed reference identifier; and at least one processor coupled to said reference location, said primary non-volatile storage and said backup non-volatile storage, said processor:

upon a reset identified by said processor, reads said pseudo-fixed reference identifier from said reference location;

compares said read pseudo-fixed reference identifier to said stored copies of said pseudo-fixed reference identifier of said primary non-volatile storage and said backup non-volatile storage;

if said read pseudo-fixed reference identifier matches said primary stored copy of said pseudo-fixed reference identifier, indicates said primary copy of vital information is valid; and if said read pseudo-fixed reference identifier matches said backup stored copy of said pseudo-fixed reference identifier only, indicates restore copying of said backup copy of vital information to said primary non-volatile storage as said primary copy associated with said copy of said pseudo-fixed reference identifier.

66. The modular processing system of claim 65, wherein said processor, in comparing said read pseudo-fixed reference identifier to said stored copies of said pseudo-fixed reference identifier of said primary non-volatile storage and said backup non-volatile storage, wherein said read pseudo-fixed reference identifier matches said primary stored copy of said pseudo-fixed reference identifier, copies said primary copy of vital information with a copy of said pseudo-fixed reference identifier to said backup non-volatile storage as said backup copy.

67. The modular processing system of claim 65, wherein said processor, in comparing said read pseudo-fixed reference identifier to said stored copies of said pseudo-fixed reference identifier of said primary non-volatile storage and said backup non-volatile storage, wherein said read pseudo-fixed reference identifier fails to match either said primary or said backup stored copy of said pseudo-fixed reference identifier, additionally compares said primary and said backup stored copies of said pseudo-fixed reference identifier, and:
    if said primary stored copy of said pseudo-fixed reference identifier fails to match said backup stored copy of said pseudo-fixed reference identifier, provides an error indication; and
    if said primary stored copy of said pseudo-fixed reference identifier matches said backup stored copy of said pseudo-fixed reference identifier, indicates continued operation of said at least one of said processors operating said associated functional module in accordance with said vital information.

68. The modular processing system of claim 65, wherein said processor fails to read said pseudo-fixed reference identifier, said processor additionally:
    compares said primary and said backup stored copies of said pseudo-fixed reference identifier, and:
        if said primary stored copy of said pseudo-fixed reference identifier fails to match said backup stored copy of said pseudo-fixed reference identifier, provides an error indication; and
        if said primary stored copy of said pseudo-fixed reference identifier matches said backup stored copy of said pseudo-fixed reference identifier, indicates continued operation of said at least one of said processors operating said associated functional module in accordance with said vital information.

69. The modular processing system of claim 65, wherein said processor additionally:
    periodically reads said pseudo-fixed reference identifier;
    compares said read pseudo-fixed reference identifier to said stored copies of said pseudo-fixed reference identifier of said primary non-volatile storage and said backup non-volatile storage, and:
        if said read pseudo-fixed reference identifier matches said primary stored copy of said pseudo-fixed reference identifier, backup copies said primary copy of vital information with said copy of said pseudo-fixed reference identifier to said backup non-volatile storage as said backup copy.

70. The modular processing system of claim 69, wherein said multi-node processing system additionally comprises an input, and wherein said processor is responsive to a trigger signal received at said input, conducting said comparison function.

71. The modular processing system of claim 65, wherein said pseudo-fixed reference identifier comprises an electronically readable "electronic serial number" fixed in an electronic module of said reference location.

72. The modular processing system of claim 65, wherein said pseudo-fixed reference comprises an arrangement of I/O pins at said reference location.

73. The modular processing system of claim 65, wherein said pseudo-fixed reference comprises settable switches of an electronic module at said reference location.

74. The modular processing system of claim 73, wherein said settable switches of said pseudo-fixed reference comprise manually settable "DIP" switches.

75. The modular processing system of claim 73, wherein said settable switches of said pseudo-fixed reference comprise manually settable multi-position switches.

76. The modular processing system of claim 65, wherein said pseudo-fixed reference comprises a non-volatile memory at said reference location.

77. The modular processing system of claim 65, wherein said pseudo-fixed reference comprises a reader and a sensible indicator readable by said reader.

78. The modular processing system of claim 65, wherein said modular processing system comprises an automated data storage library storing data storage media; said library having a plurality of storage shelves for storing data storage media; at least one accessor for accessing said data storage media in said plurality of storage shelves; and a library controller coupled to said accessor, said library controller comprising at least one computer processor storing programs for operating said accessor in accordance with said vital information, and wherein said associated functional module operated by said processor in accordance with said vital information comprises said library controller.

79. A method for verifying primary and backup copies of vital information for a processing system, said system having at least one processor, having a pseudo-fixed reference identifier separate from and coupled to said at least one processor, and having primary and backup non-volatile storage for storing said primary and said backup copies of said vital information, a copy of said pseudo-fixed reference identifier stored associated with said primary copy of said vital information of said primary non-volatile storage, said backup copy copied from said primary copy of vital information to said backup non-volatile storage associated with said pseudo-fixed reference identifier, said method comprising the steps of:
    upon a reset identified by said processor, reading said pseudo-fixed reference identifier;
    comparing said read pseudo-fixed reference identifier to said stored copies of said pseudo-fixed reference identifier of said primary non-volatile storage and said backup non-volatile storage;
    if said read pseudo-fixed reference identifier matches said primary stored copy of said pseudo-fixed reference identifier, indicating said vital information is valid; and
    if, in said comparing step, said read pseudo-fixed reference identifier matches said backup stored copy of said pseudo-fixed reference identifier only, indicating restore copying of said backup copy of vital information to said primary non-volatile storage as said primary copy associated with said copy of said pseudo-fixed reference identifier.

80. The method of claim 79, wherein said step of indicating said vital information is valid additionally comprises copying said primary copy of vital information with a copy of said pseudo-fixed reference identifier to said backup non-volatile storage as said backup copy.

81. The method of claim 79, additionally comprising the step of, if, in said comparing step, said read pseudo-fixed reference identifier fails to match either said primary or said backup stored copies of said pseudo-fixed reference identifier, comparing said primary and said backup stored copies of said pseudo-fixed reference identifier, and:
    if said primary stored copy of said pseudo-fixed reference identifier fails to match said backup stored copy of said pseudo-fixed reference identifier, providing an error indication; and if said primary stored copy of said pseudo-fixed reference identifier matches said backup stored copy of said pseudo-fixed reference identifier, indicating said vital information is valid.

82. The method of claim 79, wherein, upon said reading step failing to read said pseudo-fixed reference identifier, said method additionally comprising the step of:

comparing said primary and said backup copies of said stored serial number identifier, and:
if said primary stored copy of said serial number identifier fails to match said backup stored copy of said serial number identifier, providing an error indication; and
if said primary stored copy of said pseudo-fixed reference identifier matches said backup stored copy of said pseudo-fixed reference identifier, indicating said vital information is valid.

83. The method of claim 79, additionally comprising the steps of:

periodically reading said pseudo-fixed reference identifier;
comparing said read pseudo-fixed reference identifier to said stored copies of said pseudo-fixed reference identifiers of said primary non-volatile storage and said backup non-volatile storage, and:
if said read pseudo-fixed reference identifier matches said primary stored copy of said pseudo-fixed reference identifier, copying said primary copy of vital information with said copy of said pseudo-fixed reference identifier to said backup non-volatile storage as said backup copy.

84. The method of claim 83, additionally comprising the step of responding to an input trigger signal, conducting said periodically reading step.

85. An identifier, in a processing system having a processor element, a primary non-volatile storage, and a backup non-volatile storage, said primary non-volatile storage storing a primary copy of vital information associated with said processor, and said backup non-volatile storage storing a backup copy of said vital information, said backup copy copied from said primary copy, said identifier comprising:

a pseudo-fixed reference identifier separate from said at least one processor; and a coupling between said pseudo-fixed reference identifier and said processing system, such that said pseudo-fixed reference identifier is readable by said processing system, such that (1) a copy of said pseudo-fixed reference identifier is read by said processing system and stored associated with said primary copy of said vital information of said primary non-volatile storage, (2) said backup copy copied from said primary copy of vital information to said backup non-volatile storage and associated with a copy of said pseudo-fixed reference identifier, (3) upon a reset identified by said processor, said pseudo-fixed reference identifier is read by said processing system, (4) said processor compares said read pseudo-fixed reference identifier to said stored copies of said pseudo-fixed reference identifier of said primary non-volatile storage and said backup non-volatile storage; and (5a) if said read pseudo-fixed reference identifier matches said primary stored copy of said pseudo-fixed reference identifier, said processor indicates that said vital information is valid, and (5b) if said read pseudo-fixed reference identifier matches said backup stored copy of said pseudo-fixed reference identifier only, said processor indicates said backup copy of said vital information is to be restore copied to said primary non-volatile storage as said primary copy.

* * * * *

UNITED STATES PATENT AND TRADEMARK OFFICE
CERTIFICATE OF CORRECTION

| | | |
|---|---|---|
| PATENT NO. | : 6,625,703 B2 | Page 1 of 1 |
| APPLICATION NO. | : 09/847415 | |
| DATED | : September 23, 2003 | |
| INVENTOR(S) | : Goodman et al. | |

It is certified that error appears in the above-identified patent and that said Letters Patent is hereby corrected as shown below:

On the Title Page

Correct Inventor's Name On Patent As Follows:

Brian Gerard Goodman, Tucson, AZ

Signed and Sealed this
Eighth Day of April, 2014

Michelle K. Lee
*Deputy Director of the United States Patent and Trademark Office*